US009506662B2

(12) United States Patent
Cimberio et al.

(10) Patent No.: US 9,506,662 B2
(45) Date of Patent: *Nov. 29, 2016

(54) CONDITIONING PLANT

(71) Applicant: FIMCIM S.P.A., Milan (IT)

(72) Inventors: Roberto Cimberio, Milan (IT); Tiziano Guidetti, Milan (IT)

(73) Assignee: FIMCIM S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,837

(22) Filed: Sep. 4, 2015

(65) Prior Publication Data

US 2015/0377499 A1     Dec. 31, 2015

Related U.S. Application Data

(63) Continuation of application No. 13/273,901, filed on Oct. 14, 2011, now Pat. No. 9,157,643.

(30) Foreign Application Priority Data

Oct. 14, 2010 (IT) .................................. MI10A1880
Oct. 14, 2010 (IT) .................................. MI10A1881
Oct. 14, 2010 (IT) .................................. MI10A1882

(51) Int. Cl.
*F24F 3/044* (2006.01)
*F24F 11/00* (2006.01)
(Continued)

(52) U.S. Cl.
CPC ........... *F24F 3/0442* (2013.01); *F16K 5/0605* (2013.01); *F16K 37/005* (2013.01);
(Continued)

(58) Field of Classification Search
CPC .... F24F 3/0442; F24F 11/001; F24F 5/0089; F24F 3/052; F24D 3/1066; F24D 19/1015; F16K 5/0605; F16K 37/005
See application file for complete search history.

(56) References Cited

U.S. PATENT DOCUMENTS 1,128,097 A   2/1915   Bockelman
1,462,857 A   7/1923   Hiller
(Continued)

FOREIGN PATENT DOCUMENTS

DE   9105195   7/1991
DE   9104036   8/1991
(Continued)

OTHER PUBLICATIONS

9600 Series Tankless Water Heater Valves brochure, Red-White Valve Company, 4 pages, published as of Dec. 15, 2009 on http://redwhitevalvecorp.com/brochures/9600%20series%204%20page.pdf and accessed on Aug. 21, 2013 via http://web.archive.org/web/20101128092108/http://redwhitevalvecorp.com/brochures/9600%20series%204%20page.pdf.

(Continued)

*Primary Examiner* — Craig Schneider
*Assistant Examiner* — Kevin Barss
(74) *Attorney, Agent, or Firm* — Meunier Carlin & Curfman LLC

(57) ABSTRACT

A conditioning plant comprises a general inlet, a general outlet, a circuit which sets the general inlet in fluid communication with the general outlet, a plurality of users arranged on the circuit, and a balancing system. The balancing system comprises a sensor for detecting at least a real value depending on a difference of intensity between upstream and downstream of the users, of at least a physical parameter of the fluid; the balancing system further comprises a flow regulating organ, and a control device connected to the sensor, acting on the flow regulating organ and configured for enabling memorization of at least a reference value of a same physical parameter of the fluid, comparing the reference value with the real value, commanding the regulating organ to regulate the fluid internally of the circuit such as to maintain the real value substantially aligned with the reference value.

31 Claims, 13 Drawing Sheets

(51) Int. Cl.

| | | |
|---|---|---|
| F24F 3/052 | (2006.01) | |
| F16K 5/06 | (2006.01) | |
| F16K 37/00 | (2006.01) | |
| F24F 5/00 | (2006.01) | |
| F24D 3/10 | (2006.01) | |
| F24D 19/10 | (2006.01) | |

(52) U.S. Cl.
CPC ......... *F24D3/1066* (2013.01); *F24D 19/1015* (2013.01); *F24F 3/052* (2013.01); *F24F 5/0089* (2013.01); *F24F 11/0001* (2013.01); *F24F 11/001* (2013.01); *F24F 2011/0082* (2013.01)

(56) References Cited

U.S. PATENT DOCUMENTS

| | | |
|---|---|---|
| 1,850,879 A | 3/1932 | Hunt |
| 1,988,003 A | 1/1935 | Ford |
| 2,574,982 A | 11/1951 | Mueller et al. |
| 2,632,328 A | 3/1953 | McChesney |
| 2,661,096 A | 12/1953 | Tinker |
| 3,256,735 A | 6/1966 | Smith |
| 3,312,484 A | 4/1967 | Davenport |
| 3,365,219 A | 1/1968 | Nicolaus |
| 3,591,205 A | 7/1971 | Hamburg |
| 3,754,573 A | 8/1973 | Bales |
| 3,831,630 A | 8/1974 | McGavin |
| 3,924,882 A | 12/1975 | Ellis |
| 4,076,211 A | 2/1978 | Krechel et al. |
| 4,082,326 A | 4/1978 | Bryson |
| 4,177,832 A | 12/1979 | Price |
| 4,479,459 A | 10/1984 | Piper |
| 4,523,740 A | 6/1985 | Paitchell |
| 4,643,353 A | 2/1987 | Harris |
| 4,655,078 A | 4/1987 | Johnson |
| 4,691,727 A | 9/1987 | Zorb et al. |
| 4,726,399 A | 2/1988 | Miller |
| 4,747,626 A | 5/1988 | Hama et al. |
| 4,890,648 A | 1/1990 | Giordano |
| 4,911,201 A | 3/1990 | Nichols et al. |
| 4,921,598 A | 5/1990 | Desch |
| 5,131,623 A | 7/1992 | Giordani |
| 5,178,324 A | 1/1993 | Moesby |
| 5,188,401 A | 2/1993 | Staniforth |
| 5,409,066 A | 4/1995 | McHugh |
| 5,487,572 A | 1/1996 | Combot-Courrau et al. |
| 5,540,414 A | 7/1996 | Giordani et al. |
| 5,556,027 A | 9/1996 | Fiedrich |
| 5,590,832 A | 1/1997 | Fiedrich |
| 5,625,947 A | 5/1997 | Crawford |
| 5,669,408 A | 9/1997 | Nishino et al. |
| 5,816,285 A | 10/1998 | Ohmi et al. |
| 5,954,088 A | 9/1999 | Huang |
| 6,039,304 A | 3/2000 | Carlson et al. |
| 6,058,955 A | 5/2000 | Griswold et al. |
| 6,109,591 A | 8/2000 | Tuttle et al. |
| 6,148,845 A | 11/2000 | Borowski |
| 6,186,169 B1 | 2/2001 | McHugh |
| 6,196,262 B1 | 3/2001 | Giacomini |
| 6,302,146 B1 | 10/2001 | McHugh |
| 6,347,644 B1 | 2/2002 | Channell |
| 6,354,634 B1 | 3/2002 | Dischler |
| 6,363,782 B1 | 4/2002 | Hendey |
| 6,378,912 B1 | 4/2002 | Condon et al. |
| 6,382,679 B1 | 5/2002 | Hall |
| 6,546,946 B2 | 4/2003 | Dunmire |
| 6,568,428 B2 | 5/2003 | Pecci et al. |
| 6,588,800 B1 | 7/2003 | Meli |
| 6,655,412 B2 | 12/2003 | Reck |
| 6,685,061 B2 | 2/2004 | Wolf et al. |
| 6,748,753 B2 | 6/2004 | Takano et al. |
| 6,779,561 B2 | 8/2004 | Reck |
| 6,840,052 B2 | 1/2005 | Smith et al. |
| 7,111,643 B2 | 9/2006 | Oh |
| 7,255,373 B2 | 8/2007 | Pridham |
| 2001/0030309 A1 | 10/2001 | Carlson et al. |
| 2003/0084942 A1 | 5/2003 | McHugh |
| 2003/0192595 A1 | 10/2003 | Benson |
| 2004/0226617 A1 | 11/2004 | Arentsen et al. |
| 2004/0244855 A1 | 12/2004 | Reck |
| 2005/0084327 A1 | 4/2005 | Chelchowski et al. |
| 2005/0104369 A1 | 5/2005 | Webb et al. |
| 2005/0104371 A1 | 5/2005 | Atkinson |
| 2007/0003892 A1 | 1/2007 | Huang |
| 2007/0107789 A1 | 5/2007 | Reck |
| 2007/0125432 A1 | 6/2007 | Moesby |
| 2007/0169827 A1 | 7/2007 | Reck |
| 2008/0264080 A1 | 10/2008 | Creed et al. |
| 2008/0295907 A1 | 12/2008 | Noll et al. |

FOREIGN PATENT DOCUMENTS

| | | |
|---|---|---|
| DE | 19612161 | 10/1996 |
| DE | 19534306 | 3/1997 |
| DE | 20120764 | 5/2002 |
| DE | 20302192 | 4/2003 |
| DE | 20312939 | 11/2003 |
| DE | 102005010139 | 10/2006 |
| EP | 0341345 | 11/1989 |
| EP | 0548389 | 6/1993 |
| EP | 0911566 | 4/1999 |
| EP | 0989348 | 3/2000 |
| EP | 1067324 | 1/2001 |
| EP | 1116921 | 7/2001 |
| EP | 1139002 | 10/2001 |
| EP | 1258666 | 11/2002 |
| EP | 1308662 | 11/2004 |
| EP | 1489342 | 12/2004 |
| EP | 1521027 | 4/2005 |
| EP | 2226536 | 9/2010 |
| FR | 2754044 | 4/1998 |
| FR | 2800401 | 5/2001 |
| FR | 2812717 | 2/2002 |
| GB | 535215 | 4/1941 |
| GB | 2233739 | 1/1991 |
| GB | 2266569 | 11/1993 |
| GB | 2280006 | 1/1995 |
| GB | 2376066 | 12/2002 |
| GB | 2381307 | 4/2003 |
| GB | 2388422 | 11/2003 |
| JP | 62106185 | 5/1987 |
| JP | 6034058 | 2/1994 |
| JP | 7303808 | 11/1995 |
| JP | 9112716 | 5/1997 |
| KR | 100835707 | 5/2008 |
| WO | 99/60291 | 11/1999 |
| WO | 01/18841 | 11/2001 |
| WO | 03/001092 | 1/2003 |
| WO | 2005/031200 | 4/2005 |
| WO | 2005/098318 | 10/2005 |
| WO | 2005/114031 | 12/2005 |
| WO | 2008/029987 | 3/2008 |
| WO | 2008/039065 | 4/2008 |
| WO | 2009/002417 | 12/2008 |
| WO | 2009/156010 | 12/2009 |
| WO | 2010/007492 | 1/2010 |
| WO | 2010/093459 | 8/2010 |

OTHER PUBLICATIONS

CIM 460 Tankless Water Heater Valve, Cimberio Valve Co., Feb. 2006, 1 page.
"Copper Meter Insetters," A.Y. McDonald Mfg. Co., Water Service Products, Aug. 2007, 24 pages.
"Copper Meter Resetters," A.Y. McDonald Mfg. Co., Aug. 2007, 14 pages.
"Copper Meter Setters," A.Y. McDonald Mfg., Co., Jun. 2008, 58 pages.
"Copper Meter Yokes," Sections 8.1, 8.2 and 8A.1-8A.52, Mueller Co., Revised Apr. 1999 and Aug. 2004, 77 pages.
"Deacon Stocks Permalynx," The Deacon Connection, Deacon Industrial Supply Co., Inc., Spring 2005, 1 page.

(56) References Cited

OTHER PUBLICATIONS

"Ford Coppersetters, Linesetters, and Resetters," Section F, The Ford Meter Box Co., Inc., Jun. 2005, Web Revision Jan. 2008, 56 pages.
"Ford Inside Meter Settings," Section B, The Ford Meter Box Co., Inc., Jul. 2006, Web Revision Jan. 2008, 16 pages.
"Ford Yokes and Yoke Parts," Section E, The Ford Meter Box Co., Inc., Dec. 2006, 12 pages.
Insta-Loc™ Push-Fit Ball Valves advertisement, Legend Valve & Fitting, Inc., 2006, 1 page.
Instructions for Trimming Tankless Water Heater Installations from Noritz, Noritz with Webstone, Bosch and Rinnai, 1 page.
"Iron Yokes," A.Y. McDonald Mfg. Co., Aug. 2005, 16 pages.
Isolator EXP, Brochure, Webstone Co., Inc., Sep. 2005, 1 page.
Itap-Fit Fittings, ITAP, retrieved on Nov. 7, 2008 from http://www.itap.it/en/index.php?option=com_content&task=category&sectionid=18&id=2... 2006, 4 pages.
Model PB-56 Purge and Balancing Valve, Installation Instructions, Watts Regulator Co., 2000, 1 page.
"PermaLynx, permanent push-to-connect system," installation instructions, I-Permalynx, Victaulic Co., 2007, 4 pages.
Pro-Pal Series, 4067 Series, Forged Brass Tees with Hi-Flow Ball Valve Drain—IPS, Webstone Co., Inc., 2007, 1 page.
Pro-Pal Series, 5061 Series, "Full Port Forged Brass Ball Valves with Hi-Flow Hose Drain CxC with Reversible Handle," Webstone Co., Inc., 2007, 1 page.
Pro-Pal Series, 5067 Series, Forged Brass Tees with Hi-Flow Ball Valve Drain—CxC, Webstone Co., Inc., 2007, 1 page.
Pro-Pal Series, 5865 & 5866 Series, "Primary/Secondary Loop Purge Tee CxC Primary and Secondary Loop with Reversible Handle," Webstone Co., Inc., 2007, 1 page.
Series RPV Residential Purge, Drain and Balancing Valves, Brochure, Watts Regulator Co., 2004, 1 page.
SharkBite Connection System, Cash Acme, 2008, 1 page.
Sub-Metering Water Services, The Ford Meter Box Co., Inc., 8 pages, Jun. 7, 2007 on the www.fordmeterbox.com website.
International Search Report, dated Oct. 21, 2008, in connection with related International Application No. PCT/US2008/007528.
International Preliminary Report on Patentability and Written Opinion, dated Dec. 22, 2009, in connection with related International Application No. PCT/US2008/007528.
International Search Report, dated May 3, 2010, in connection with related International Application No. PCT/US2010/000401.
International Preliminary Report on Patentability and Written Opinion, dated Aug. 16, 2011, in connection with related International Application No. PCT/US2010/000401.
Italian Search Report for Italian application publication No. IT MI20101881, pp. 1-2., dated Jun. 9, 2011.
Italian Search Report for Italian application publication No. IT MI20101882, pp. 1-2., dated Jun. 9, 2011.
Italian Search Report for Italian application publication No. IT MI20101880, pp. 1-2., dated Jun. 9, 2011.
Related U.S. Appl. No. 11/812,890, filed Jun. 22, 2007.
Related U.S. Pat. No. 8,109,297, issued Feb. 7, 2012.
Communication from Examining Division, European Patent Office for Application No. 11185084.8, dated Feb. 10, 2015.
Communication from Examining Division, European Patent Office for Application No. 11185078.0, dated Feb. 12, 2015.
Communication from Examining Division, European Patent Office for Application No. 11185062.4, dated Feb. 2, 2015.
U.S. Appl. No. 13/273,901, filed Oct. 14, 2011, and the prosecution history thereof.

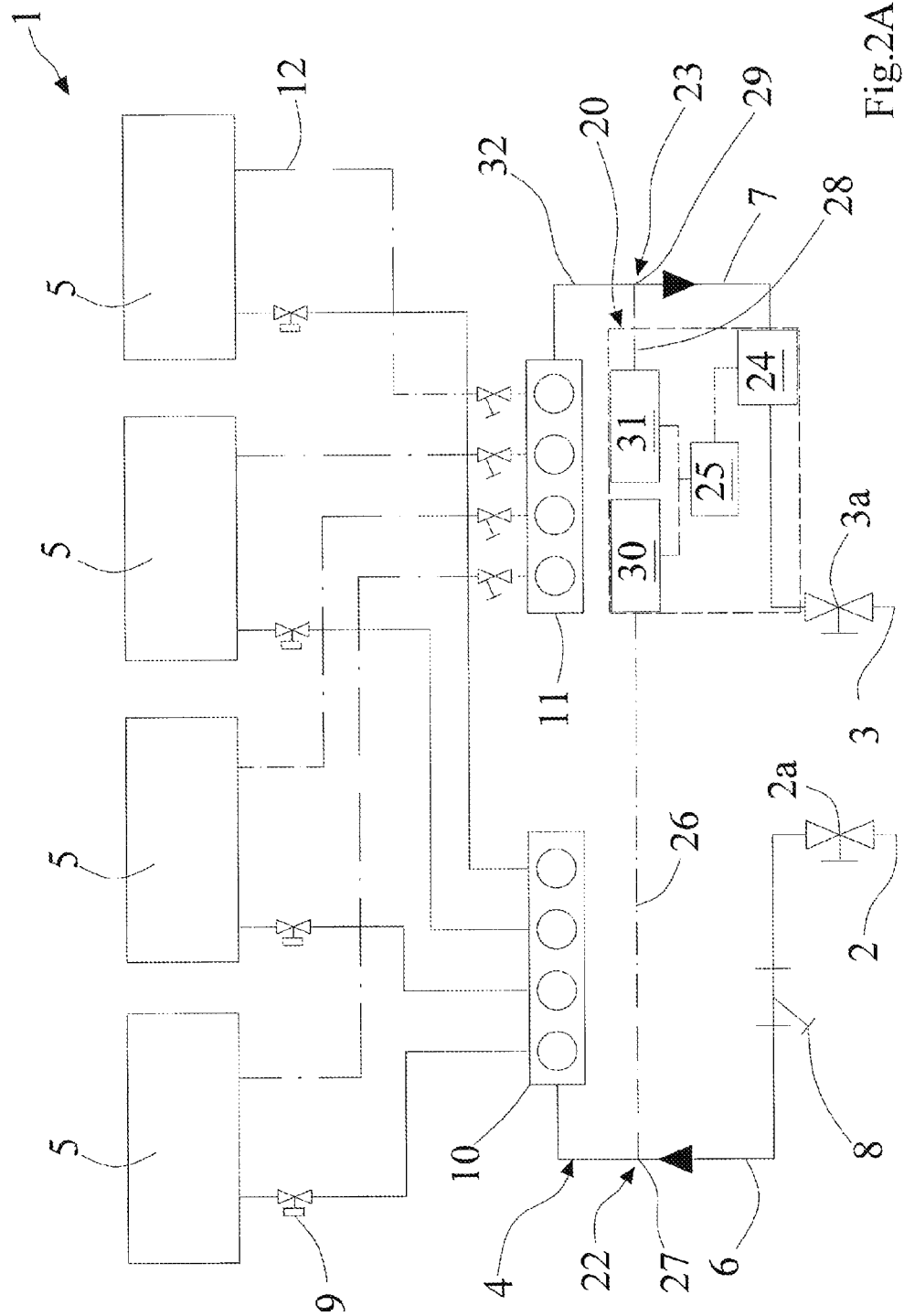

CONDITIONING PLANT

CROSS-REFERENCE TO RELATED APPLICATIONS

This application is a continuation of U.S. patent application Ser. No. 13/273,901, filed Oct. 14, 2011, which claims priority to Italian Patent Application Nos. MI2010A001882, MI2010A001881, and MI2010A001880, filed Oct. 14, 2010, the disclosures of which are herein incorporated by reference in their entireties.

FIELD

A conditioning system is described that is able to balance the circuit at every change of flow to the users. The conditioning system can be used for heating, cooling, or more generally for public environment climate control.

BACKGROUND

As is known conditioning plants exist that are equipped with systems for adjusting a pressure and/or flow rate internally of a circuit.

A first example, described in application WO2008029987, concerns a conditioning system for temperature control in a determined environment. The system has a control unit directly connected to the users and to the delivery manifold. The control unit receives a signal from the sensors installed in the environment and automatically sends the signal to flow control valves to enable a selective control of the temperature in a plurality of areas into which the environment is divided. The described system requires a control circuit that controls the individual valves, and a corresponding sensor system. The system is therefore extremely complex and expensive.

A second example, in application WO201074921, shows a method for balancing a hydraulic network. Users are connected to the hydraulic network, which users are each provided with the respective valves, positioned at each user. A balancing valve is located upstream of the users. The balancing valve is set to maintain certain setting parameters. The balancing valve is also able to detect the differential pressure across the valve and/or the flow rate, and to keep these values constant.

A third example discloses a regulating system of a conditioning plant, which regulating system includes a mechanical valve. The valve is installed downstream of the users and is also hydraulically connected to a portion of the circuit which is located upstream of the users. The valve is able to balance the pressure on the upstream portion of the circuit of the users with the pressure at the point where it is installed. The regulating system described is able to balance the system while maintaining a predetermined pressure differential between upstream and downstream of the users of the plant. This system is extremely rigid as it is limited by the mechanical characteristics of the valve.

SUMMARY

A first aim is to obviate one or more of the limitations and drawbacks described above.

A further aim is to create a programmable automatic balancing system such as to ensure optimum flexibility.

An additional aim is to provide the fluid control with a fine degree of sensitivity. Lastly, an aim is to provide a system of simple manufacture that is easily controllable and therefore easy and inexpensive to install.

At least one of the specified aims is attained by a plant according to one or more of the appended claims.

Further aspects are described below.

A first aspect includes a control valve for fluid systems, in particular conditioning systems, comprising: at least a valve body exhibiting at least an inlet, at least an outlet and at least a channel which sets the inlet in fluid communication with the outlet, at least a check element of fluid operating in the channel and forming the regulating organ together with the valve body, the fluid check element defining, in cooperation with the valve body, a passage opening for fluid between the inlet and the outlet of a variable size, according to positions assumed by the check element in relation to the valve body along a predetermined operating path, the check element being configured such as:

to receive in input at least a first signal relating to an intensity of a physical parameter of the fluid circulating in the first section of the plant and a second signal relating to the intensity of a physical parameter of a fluid circulating in the second section of the plant, to generate the output signal as a function of the first signal and the second signal, said output signal being used to control the angular position of the check element.

In a 2nd aspect in accordance with the 1st aspect, the check element configured such as to rotate with respect to a rotation axis which extends transversally with respect to a prevalent axis of development of the channel.

In a 3rd aspect in accordance with the 2nd aspect the control device is configured such as to move the check element among a plurality of distinct operating positions which are angularly offset to one another. The angular positions are separate and at each distinct angular position the control device is configured such as to evaluate, on the basis of the output signal, whether an additional angular displacement is required or not. An angular step is defined between an operating position and a next angular operating position. In practice a step is understood to mean the angular distance between the distinct positions of the check element and is configured such as to perform the said evaluation.

In a 4th aspect in accordance with the previous aspect, the angular step, at least for a predetermined tract of the operative path, is less than 1° (one degree).

In a 5th aspect in accordance with any one of the preceding third or fourth aspects, the angular step, at least for the predetermined tract of the operative path, is less than 0.5° (half a degree).

In a 6th aspect in accordance with any of the above aspects from the third to the fifth, the angular step, at least over a predetermined tract of the operating path, is less than 1°, optionally less than 0.5%; and/or wherein the angular step is not constant over the operating path, optionally wherein the tract in which the step is not constant comprises at least 10% of the operating path.

In a 7th aspect in accordance with any of the above aspects from the third to the sixth, where the angular step reduces progressively, optionally exponentially, for a stretch that includes at least 10% of the operating path.

In an 8th aspect according to any of the above aspects from 3 to 7, the size of the angular step is a function of the intensity of the physical parameter of the fluid circulating in the first section and the intensity of the physical parameter of the fluid circulating in a second section of the plant. In practice, the control device regulates the angular step as a function of the measurements, for example of pressure, in the two sections. For example the control device is configured such as to reduce the angular step progressively on reduction of a difference between a reference value and a real value given by a difference of intensity of the physical parameter of the fluid circulating in the first section and the intensity of the same physical parameter of the fluid circulating in a second section.

In a 9th aspect in accordance with any of the above aspects from 3 to 8, the tract of the operating path in which the step is not constant and/or is less than 1° comprises an initial tract of the operating path, the initial tract being in turn comprised between an initial position of complete closure of the passage opening and an intermediate position in which the passage opening is open to not more than 40%.

In a 10th aspect in accordance with any of the above aspects from 3 to 9, the tract of the operating path in which the step is not constant and/or is less than 1° comprises an initial tract of the operating path, the final tract being in turn comprised between a final position of complete opening of the passage and an intermediate position 47 in which the passage opening is open to not more than 30%.

In a 11th aspect in accordance with any of the above aspects from 3 to 10, the tract of the operating path in which the step is not constant and/or is less than 1° comprises a final tract of the operating path, the final tract being in turn comprised between a final position of complete opening of the passage and an intermediate position in which the passage opening is open to not more than 50%.

In a 12th aspect in accordance with any of the above aspects from 3 to 11, the tract of the operating path in which the step is not constant and/or is less than 1° comprises a final tract of the operating path, the final tract being in turn comprised between an final position of complete closure of the passage opening and an intermediate position in which the passage opening is open to not more than 40%.

In a 13th aspect in accordance with any of the above aspects, the check element has an external surface rotating about the axis which exhibits a substantially spherical or cylindrical conformation.

In a 14th aspect in accordance with any of the above aspects, the valve body 36 exhibits at least a wall located transversally of the prevalent development axis of the channel and respectively exhibiting a passage opening, the wall being arranged upstream and/or downstream of the check element such as to define the shape of that passage opening. In practice, the wall is a shaped diaphragm and in cooperation with the opening of the check element defines the shape of the passage opening.

In a 15th aspect in accordance with any one of the preceding aspects, the passage opening is conformed such that following a movement of the check element over an initial tract and/or a final tract of the operating path, the incremental ratio between the percentage variation of the area of the passage opening and the percentage displacement of the check element exhibits an absolute value comprised between 0 and 4, wherein the percentage variation of the area of the passage opening comprises the ratio between the variation of the passage area following a displacement of the check organ and a reference area, and wherein the percentage displacement comprises the ratio between the displacement of the check element and the operating path.

In a 16th aspect in accordance with any one of the preceding aspects, the passage opening is shaped such that following a movement of the check element over an initial tract and/or a final tract of the operating path, the incremental ratio between the percentage variation of the area of the passage opening and the percentage displacement of the check element exhibits an absolute value comprised between 0 and 4, optionally between 0 and 2.5.

In a 17th aspect in accordance with any one of the preceding aspects, the passage opening is shaped such that following a movement of the check element over an initial tract and/or a final tract of the operating path, the incremental ratio between the percentage variation of the area of the passage opening and the percentage displacement of the check element exhibits an absolute value comprised between 0 and 4, optionally between 0 and 1.5.

In a 18th aspect in accordance with any one of the preceding aspects from 15 to 17, the incremental ratio between the percentage variation of the area of the passage opening and the percentage displacement of the check element over the initial tract comprising not more than 30% of the operating path, exhibits an absolute value comprised between 0 and 4.

In a 19th aspect in accordance with any one of the preceding aspects from 15 to 18 the incremental ratio between the percentage variation of the area of the passage opening and the percentage displacement of the check element over the initial tract comprising not more than 30% of the operating path, exhibits an absolute value comprised between 0 and 2.5.

In a 20th aspect in accordance with any one of the preceding aspects from 15 to 19 the incremental ratio between the percentage variation of the area of the passage opening and the percentage displacement of the check element over the final tract comprising not more than 30% of the operating path, exhibits an absolute value comprised between 0 and 4.

In a 21st aspect in accordance with any of the preceding aspects from 15 to 20, the incremental ratio between the percentage variation of the area of the passage opening and the percentage displacement of the check element over the final tract, comprising not more than 40% of the operating path, exhibits an absolute value comprised between 0 and 2.5.

In a 22nd aspect in accordance with any of the preceding aspects from 15 to 21 the incremental ratio between percentage variation of the area of the passage opening and the percentage displacement of the check element exhibits an absolute value which is substantially constant over an intermediate tract of the operating path comprised between the initial tract and the final tract, and wherein the intermediate tract comprises between 20% and 40% of the operating path.

In a 23rd aspect in accordance with any of the preceding aspects said first and second signal are related to the intensity of the fluid pressure in said first and second section of the plant.

In a 24th aspect in accordance with any one of the preceding aspects generating an output signal comprises determining a control differential signal comprising a difference or a ratio between the intensity of the first signal and the second signal.

In a 25th aspect in accordance with any one of the preceding aspects, generating the output signal comprises determining a control differential signal comprising a difference or a ratio between the intensity of the first signal and the second signal, wherein the control differential signal comprises the difference or ratio between the intensity of the fluid pressure in the first section and the intensity of the fluid pressure in the second section, optionally wherein the control device comprises a pressure differential gauge which receives in input the first signal and the second signal and generates in output the control differential signal.

In a 26th aspect in accordance with any one of the preceding aspects, the control device is configured to:
enable setting at least a reference value,
compare the reference value with the value of the control differential signal, and
generate the output signal as a function of the comparison.

In a 27th aspect in accordance with any one of the preceding aspects, the control device comprises an actuator, for example an electrical actuator, acting on the check element the actuator enabling displacement of the check element along the operating path.

In a 28th aspect in accordance with the preceding aspect, the control device is connected with the actuator, the control device further being configured such as to command a movement of the check element as a function of the output signal and to position the check element according to the plurality of positions along the operating path.

In a 29th aspect in accordance with any one of the preceding aspects 27 or 28, the control device controls the size of the angular step according to which the actuator moves the check element in accordance with the value of the control differential signal and a reference value, optionally wherein the control device controls the size of the angular step according to which the actuator moves the check element in accordance with the difference between the control differential signal and the reference value.

In a 30th aspect in accordance with any one of the preceding aspects, the regulating valve and/or the plant comprises: acoustic signalling means and/or optical signalling means, the acoustic signalling means and/or the optical signalling means being connected to the control device which is configured such as to command the acoustic signalling means and/or optical signalling means to provide:
an optical and/or acoustic representation of an instant value of the output signal, and/or
an optical and/or acoustic representation of displacement of an instant value of the output signal with respect to a reference value.

In a 31st aspect in accordance with any one of the preceding aspects, the control device is configured to control a movement of the check element thereby enabling a reduction in the difference between the reference value and the value of the control differential signal.

In a 32nd aspect in accordance with any one of the preceding aspects, said control device includes setting means, said setting means being connected to the control device, the control device being configured such as to enable a setting of a predetermined number of control parameters that define the working conditions of the valve.

In a 33rd aspect in accordance with any one of the preceding aspects, the control parameters comprising at least a parameter selected from the group having:
a first control parameter relating to a type of movement of the check element,
a second control parameter relating to a maximum excursion of the values of the first signal and the second signal or of the value of the difference between the first signal and the second signal,
a third control parameter relating to the type of function connecting the output signal and the first signal and the second signal, and
a fourth control parameter relating to a velocity of convergence between the real value and the reference value.

In 34th aspect in accordance with preceding aspect 33, the second control parameter comprises bottom scale values of the pressure differential gauge.

In a 35th aspect in accordance preceding aspects 33 or 34, in relation to the third parameter the function comprises a link of a proportional or integral or derivate type, or a combination thereof.

In a 36th aspect in accordance with the 33rd or 34th or 35th aspects, the fourth control parameter specifies a convergence time defined as a time transitory in which the value of the control differential signal converges to the reference value.

In a 37th aspect in accordance with 33rd or 34th, 35th or 36th aspects, the setting means enable memorisation of a predetermined number of configurations relating to values of the control parameters which are useful for managing the control device, optionally wherein the setting means comprise micro switches.

In a 38th aspect in accordance with any one of the preceding aspects, the regulating valve further comprises a temperature sensor positioned on the valve body, the temperature sensor enabling detection of the temperature at the second section.

In a 39th aspect in accordance with any one of the preceding aspects, the control device further comprises input means, the input means enabling setting at least a reference value, optionally enabling setting a reference pressure differential between the first section and the second section.

In a 40th aspect in accordance with any one of the preceding aspects, the control device comprises a memory and is configured such as to enable memorising a plurality of predetermined reference values and for enabling selection of at least one of those values on the part of a user.

In a 41st aspect in accordance with one of the preceding aspects, the check element has a lateral surface of rotation of cylindrical or spherical shape.

In a 42nd aspect in accordance with any of the one of the preceding aspects, the passage opening comprises a frontal shaping exhibiting two substantially symmetrical parts wherein each of the parts exhibits a first portion shaped as an arc of a circle, a second portion shaped as an arc of a circle having a smaller radius than the arc of the first portion, a connecting inflection which connects the first portion with the second portion.

In a 43rd aspect in accordance with any one of the preceding aspects the passage opening comprises a longitudinal shaping relating to a longitudinal section with respect to the prevalent development axis of the channel, exhibiting a progressively growing section from the inlet to the outlet of the valve body.

In a 44th aspect in accordance with any one of the preceding aspects, the control device is configured such as to receive the control parameters and, depending on the value thereof, adjust the rotation direction of the check element according to the axis which extends transversally to the axis of the prevalent development axis.

In a 45th aspect in accordance with any with any one of the preceding aspects, the first section is defined at the valve body, the regulating valve 1 comprising a passage which places the channel in fluid communication with the differential pressure gauge.

In a 46th aspect in accordance with any with any one of the preceding aspects, the check element operating in the channel of the valve body is configured such as to rotate according to a movement angle with respect to a rotation axis which extends transversally with respect to a prevalent development axis of the channel, optionally in which the check element exhibits a lateral rotation surface having a cylindrical or spherical conformation.

In a 47th aspect in accordance with the preceding aspect, the incremental ratio between the percentage variation of the area of the passage opening and the percentage displacement of the check element, for the initial tract comprised between 20% and 30% of the operating path, falls within a range of between 0 and 1.5.

In a 48th aspect according to any of aspects 46 or 47, the incremental ratio between the percentage variation of the area of the passage opening and the percentage displacement of the check element, for the final tract comprised between 20% and 30% of the operating path, falls within a range of between 0 and 1.5.

A 49th aspect relates to a fluid distribution system to a plurality of users, in which the system uses one or more of the valves according to any one of aspects 1 to 48.

A 50th aspect relates to a conditioning system 1 comprising: at least a general inlet, at least a general outlet, a circuit which sets the general inlet in fluid communication with the general outlet, a plurality of users arranged on the circuit, at least a balancing system of the flow acting on the circuit, the balancing system comprising:

at least a sensor for detecting at least a real value depending on a difference of intensity between a first section upstream of the users and a second section downstream of the users, of at least a physical parameter of the fluid, at least a flow regulating organ, and at least a control device connected to the sensor, acting on the flow regulating organ and configured for enabling memorisation of at least a reference value of a same physical parameter of the fluid, comparing the reference value with the real value, commanding the regulating organ via an output signal in order to regulate the fluid internally of the circuit such as to maintain the real value substantially aligned with the reference value, or such as to reduce a difference between real value and reference value.

In a 51st aspect according to the 50th aspect, the plant comprises a first detecting line which places a first point of the circuit situated upstream of each user in fluid communication with the sensor of the balancing system and in which the plant comprises a second detection line which sets a second point of the circuit situated downstream of each user in fluid communication with the sensor of the balancing system.

In a 52nd aspect according to aspect 51, the second point is situated substantially on the regulating organ, the regulating organ being situated downstream of each user, directly connected on the circuit and in fluid communication with the sensor.

In a 53rd aspect according to aspects 50, or 51, or 52 the sensor is a differential sensor, which enables detecting the intensity difference between upstream and downstream of the users of the physical parameter of the fluid, and wherein the sensor detects a difference between a first real value relative to the intensity of the physical parameter at the first point of the circuit, and a second real value relative to the intensity of the physical parameter relative to the second point of the circuit.

In a 54th aspect according to aspects 50, or 51, or 52, the sensor comprises a first sensor, which is in fluid connection with the first detecting line and enables detecting the intensity of the physical parameter at the first point of the circuit, and a second sensor which is in fluid connection with the second detecting line and enables detecting the intensity of the physical parameter at the second point of the circuit.

In a 55th aspect according to any of the preceding aspects from 50 to 54, each user comprises a respective delivery channel emerging from the circuit, a respective return channel in fluid connection with the delivery channel and arranged such as to return fluid into the circuit, at least a user device hydraulically interposed between the delivery channel and the return channel.

In a 56th aspect according to any of the above aspects from 50 to 55, each user comprises a respective delivery channel emerging from the circuit, a respective return channel in fluid connection with the delivery channel and arranged such as to return fluid into the circuit, at least a user device hydraulically interposed between the delivery channel and the return channel, and wherein each user exhibits at least a respective closing organ, partial or total, arranged either on the delivery channel or on the return channel.

In a 57th aspect according to any one of the preceding aspects 55 or 56, the plant comprises at least a delivery manifold arranged upstream of the users, at least a return manifold arranged downstream of the users, the delivery manifold and the return manifold being respectively connected to the general inlet for the distribution of the fluid to the users and to the general outlet for collecting the fluid in outlet from the users.

In a 58th aspect according to the preceding aspect, the regulating organ is engaged to a line interposed between an outlet of the return manifold and the general outlet.

In a 59th aspect according to any of the above aspects from 50 to 57, the regulating organ and the control device are part of a regulating valve operating downstream of the users, wherein the regulating valve.

In a 60th aspect according to preceding aspect 59, the regulating valve has the characteristics of any one of the aspects from the first to the forty-eighth.

BRIEF DESCRIPTION OF THE DRAWINGS

Some embodiments and some aspects will be described in the following with reference to the accompanying figures of the drawings, provided by way of non-limiting example, in which:

FIG. 2a illustrates a third configuration of the conditioning plant;

FIG. 3 is a perspective view of a valve used in the plants of FIGS. 1-2a;

DETAILED DESCRIPTION

Figure 1:
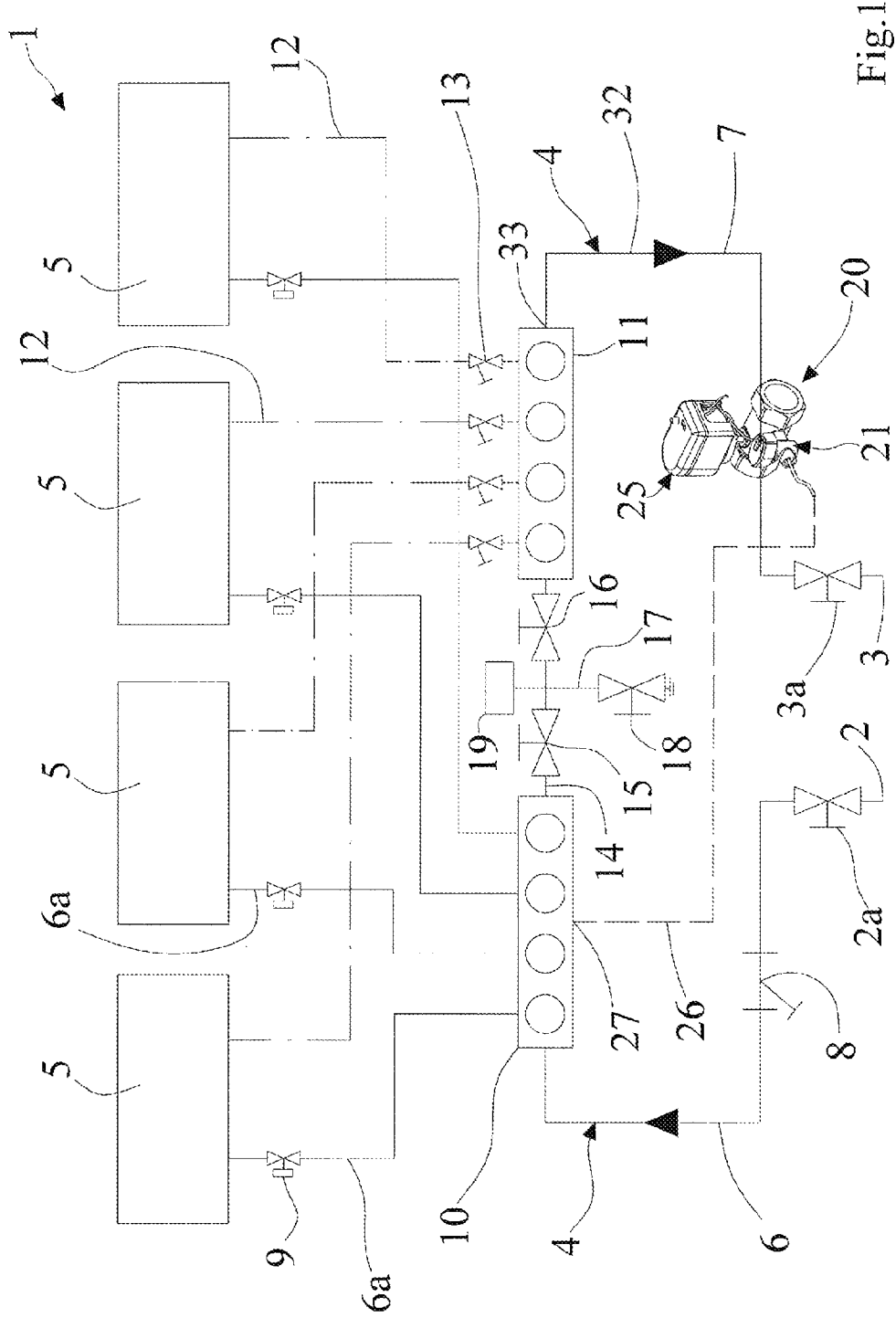
FIG. 1 illustrates a first configuration of the conditioning plant.
Figure 2:
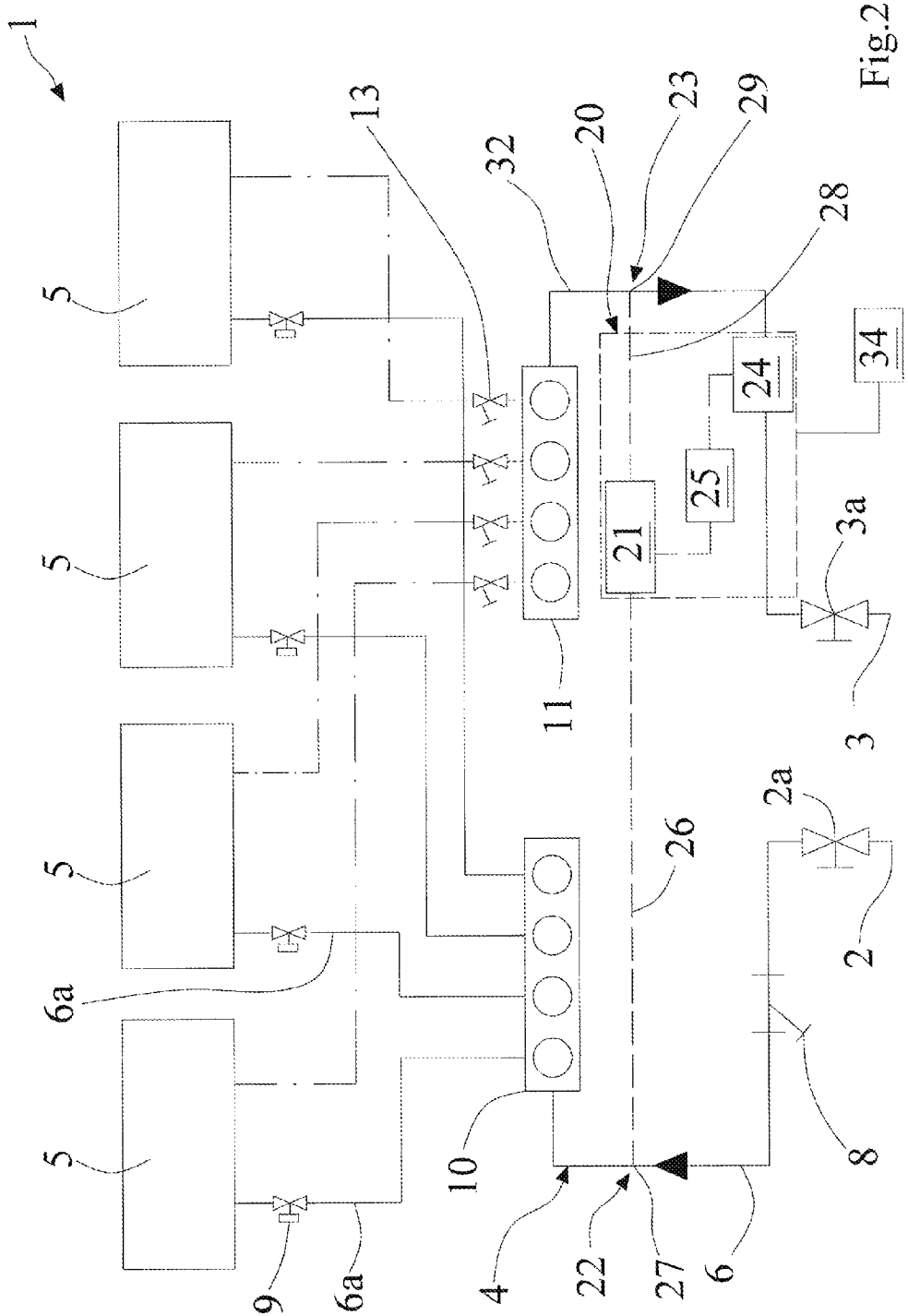
FIG. 2 illustrates a second configuration of the conditioning plant.

With reference to the accompanying figures of the drawings, 1 denotes in its entirety a conditioning plant comprising a general inlet 2, a general outlet 3, and a circuit placing the general inlet in fluid communication with the general outlet 3.

Both the general inlet and the general outlet avail of an inlet valve 2a and an outlet valve 3a, for example of a sphere or shutter type, which regulate the general flow internally of the circuit 4.

The circuit supplies a fixed number of user units 5 (herein indicated as users), for example, each comprising one or more heat exchangers and related groups of ventilation (fan coil), which are arranged at or near areas to be conditioned. Heat exchange takes place inside the users, enabled by the fluid supply from the general inlet 2.

The circuit exhibits at least two main channels: a delivery channel 6, for sending the fluid to the users, and a return channel 7 in connection with the delivery channel 6 and arranged such as to receive the fluid downstream of the users. The users 5 are hydraulically interposed between the delivery channel 6 and the return channel 7. Before being distributed to the various utilities the fluid is intercepted by a filter 8 which prevents impurities from reaching the users.

The delivery channel 6 and the return channel 7 are respectively connected to a delivery manifold 10 upstream of the users 5 and a return manifold 11 downstream of the users 5. The delivery manifold 10 and the return manifold 11 are connected respectively to the general inlet 2, for the distribution of the fluid to the users 5, and the general outlet 3, for the collection of the fluid in outlet from the users 5.

The conditioning plant also includes, for each user, at least one respective delivery line 6a exiting from the delivery manifold, and leading to the users; a respective partial or total closing organ 9 acts on each delivery line 6a. The closing organs 9 intercept the fluid in inlet to the users 5. The organs 9 are activated such as to vary the supply parameters of a determined user; in particular each closing organ can comprise an on/off valve which closes or opens supply to each user 5.

The return manifold 7 receives from each user a respective return line 12; on each return line a balancing valve 13 is placed whose function is to regulate the flow in outlet from the users as a function of temperature requirements required for each environment in which the user 5 is installed.

The plant also has a connecting circuit 14, which sets the delivery manifold 10 in fluid communication with the return manifold 11, bypassing the users. A shut-off valve 15 of the manifold 10 and a shut-off valve 16 of the return manifold 11 are arranged on the connecting circuit 14. The connecting circuit 14 is in turn in fluid connection with a discharge 17 interposed between the respective closing valves of the delivery manifold closing valve and return valve. The discharge 17 exhibits a general discharge valve 18 configured for discharging excess fluid present in the connecting circuit 14 after the circuit 4 setting. In addition to the general discharge valve 18, the drain circuit 17 exhibits a breather valve 19, positioned in a higher position than the manifolds and useful for eliminating any air bubbles inside the circuit 4.

The air conditioning system 1 comprises a flow balancing system 20, active on the circuit 4. The balancing system 20 comprises at least a sensor 21 for detecting a real value which is dependent on the difference of intensity that a same physical parameter, such as a pressure or flow, assumes between a first section 22 upstream of the users 5 and a second section 23 downstream of the users. More specifically, the sensor can measure for example a difference or ratio between the real pressure in the section 22 and the pressure in the section 23, providing an output signal that is proportional to said difference or ratio between the pressures in the two above-cited sections.

The balancing system further exhibits a flow regulating device 24 and a control device 25 connected to the sensor 21 and active on the flow regulating organ 24. In practice, the control device comprises a control unit, for example a microprocessor, capable of receiving the input signal from the sensor/s 21 and acting on the regulating organ as a function of the signal. According to one embodiment, the balancing system 20 is placed in connection with two detecting lines. More specifically, a first detecting line 26 places in fluid communication a first point 27, part of the first section 22 of the circuit 4 and located upstream of each user 5, with the sensor 21 of the balancing system 20; a second detecting line 26 places in fluid communication a second point 28, part of the second section 23 of the circuit 4 and located downstream of each user 5, with the sensor 21 of the balancing system 20. The sensor 21, for example a differential sensor, is configured such as to detect the difference in intensity between upstream and downstream of the users 5, the physical parameter of the fluid. In more detail, the sensor 21 detects a difference between a first real value related to the intensity of the physical parameter at the first point 27 of the circuit 4, and a second real value of the intensity of the same physical parameter related to the second point 29 of the circuit 4. The second point 29 is for example located substantially on the regulating organ, which is arranged downstream of each user 5, directly connected to the circuit 4 and in fluid connection with the sensor 21. If the detected parameter is the pressure, the sensor 21 includes a pressure differential sensor which generates an output signal proportional to the intensity or a function of the pressure difference between points 27 and 29.

Alternatively to the use of a differential sensor, a different configuration of the circuit can be realised in which the sensor 21 comprises a first sensor 30, in fluid connection with the first detecting line 26, which enables detecting the intensity of the physical parameter at the first point 27 of the circuit 4, and a second sensor 31, which is in fluid connection with the second detecting line 28, which detects the intensity of the same physical parameter at the second point 29 of the circuit 4.

The return channel 7 can comprise a line 32, interposed between a general outlet 33 of the return manifold 11 and the general outlet 3 of the plant 1, on which the regulating organ 24 is engaged.

As previously mentioned, the first point 27 is located upstream of the users 5, in particular, the first point 27 can be located substantially on the delivery manifold 10, while the second detecting point 29 is located on the regulating organ 24.

As for the control device 25, it is connected to the above-described sensor/s and with the regulating organ. The control device is configured such as to enable a memorising of a reference value for the physical parameter of the fluid being measured with the described sensors. For example, the control device may comprise one or more microprocessor unit/s and associated memories capable of storing a code which when executed by the microprocessor unit/s makes the control device capable of performing the procedures described below. The control device is also configured such as to compare the reference value with the real value in relation to the same physical parameter, and such as to control the regulating organ 24 via an output signal such as to regulate the flow of fluid within the circuit 4 such as to maintain the value substantially aligned with the reference value. For example, the control device is configured to determine the real value as the difference between the values of the physical parameter measured in the first and second section by the sensor/s 21 (for example, the difference in pressure between the two sections) and such as to compare the difference with a reference value stored by the control device. Following the comparison, if the difference between the pressures in the two above-mentioned sections is equal to or close to the set reference value, the control device does not exert any action up until a subsequent control cycle that can be activated manually or determined periodically by the control device or determined by the control device on reaching a threshold of maximum deviation between the real value and the reference value.

The plant also has available a visualization tool 34 connected to the control device 25. The control device 25 is configured to control a visualising on the display instrument 34 of the real value (for example, the real difference between the pressures measured in sections 22 and 23), the reference value (for example, a reference pressure difference) or both the values of said physical parameter of the fluid.

In the example of realization shown, the regulating organ 24 and the control device 25 are part of a control valve 35 operating downstream of the users 5. The control valve 35 includes: a valve body 36 exhibiting at least an inlet 37, an outlet 38 and a channel 39 which sets the inlet 37 in fluid communication with the outlet 38. The valve body 36 exhibits connecting organs 40 arranged at the inlet 37 and the outlet 38 of the valve which enabling fixing the valve on the circuit 4. The connecting organs can be, for example, threading or rapid attachments. The channel 39 exhibits a seating 41 capable of accommodating a valve element 42 which in cooperation with the valve body 36 forms the regulating body 24 and defines a passage opening 43 between the inlet 37 and outlet 38. The passage opening 43 has variable amplitude as a function of the positions assumed by the check element 42 with regard to the valve body 36. The check element 42 is configured such as to act along a predetermined travel path which includes a predetermined number of operating positions that are angularly distinct or translationally staggered to one another: in practice, the control device is configured such as to move the check element between an operating position and a next operating position in a next step controlled by the control device 25 itself, as is described in more detail below.

The movement of the check element 42 may be rotary or translational. In the first case the movement takes place by rotation in an angle of movement around an axis of rotation 44 which extends transversally with respect to a prevalent development axis 50 of the channel 5. In the second case, the movement can take place in a straight direction.

Considering the case where the check element 42 performs a rotary movement: to perform a rotary movement, the check element 42 must have an outer surface that is substantially spherical or cylindrical, as can be seen in the accompanying figures. The various operative positions of the element 42 are angularly offset by one or more angular steps of amplitude that are controlled by the control device: at each angular step the control device is programmed to periodically re-verify the difference between the real value and the reference value, and if this difference is not acceptable, the control device will command a new angular step.

In the case of a rotary valve, the control device can be configured such that along at least part of the operating path (such as a tract greater than or equal to 10% of the operating path), the pitch angle has a value of less than 1° (one degree), optionally less than 0.5° (half a degree) in order to avoid destabilisation in the control of the valve.

The control device can also be made to adjust the angular pitch in order to maintain this constant pitch along the operating path.

Alternatively, the control device can adjust the pitch so that the amplitude thereof is variable along a tract (for example, for a distance greater than or equal to 10% of the operative path) or along the entire operating path. For example, a step can be included that is a function of the deviation between the real value of the physical parameter detected by the sensors and the reference value of the physical parameter itself: for example, the step can be relatively large (for example, one or more degrees) if the difference between the real value and the reference value is greater than a certain threshold and may be relatively small (e.g. less than one degree) if the difference between the real and the reference values is below a certain threshold. Alternatively, in case of variable pitch, the angular pitch can be reduced progressively during the opening or closing of the valve: optionally the step may for example be reduced gradually, exponentially as the valve is opened.

Figure 12:
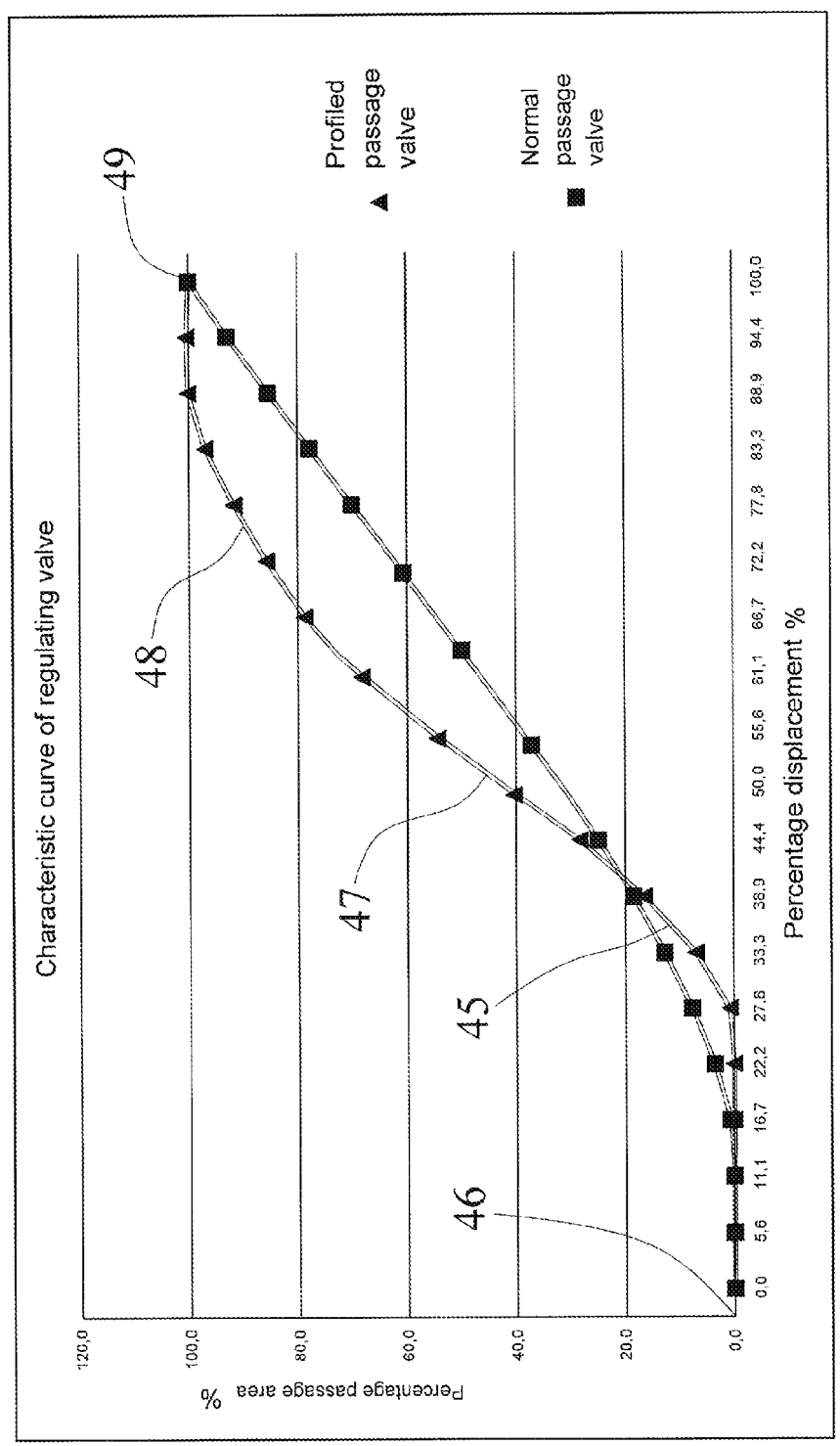
FIG. 12 is a comparative diagram relating to the characteristics of two valves that relates the percentage area of the passage opening with the percentage displacement of the check element.

As shown in FIG. 12, the tract of the operating path where the pace is variable and possibly less than one degree includes an initial tract 45 between an initial position 46 of complete closure of the passage opening 43 and an intermediate position 47 in which the passage opening 43 is open no more than 50%, optionally not more than 40%. The tract of the path in which the pitch is variable and possibly less than a degree also includes a final section 48 between a final position of complete opening of the passage opening 43 and the intermediate position 47 in which the passage opening 43 is open no more than 40%, optionally not more than 30%.

In an embodiment, illustrated in FIGS. 4, 6, 7 and 10, the passage opening 43 is shaped such that, following a movement of the check element 42 over a first and/or final tract (which may coincide with the lines 45, 48 of FIG. 12) of the operating path, the incremental relationship between the percentage change of the area of the passage opening 43 and the percentage displacement of the check element 42 exhibits an absolute value that is variable along the path but comprised between 0 and 4, optionally between 0 and 2.5. Thanks to this type of variation the increase in area upon the movement of the check element is not excessive and thus enables an efficient control of the pressure fall (and flow) through the valve, enabling better management of the plant balance (again, a curve characteristic of a profiled-opening valve is represent in FIG. 12—see the curve with the continuous tract with reference triangles).

As can be seen in FIG. 12, over the initial tract 45 that includes no more than 30% of the operating path, the incremental ratio between the percentage variation of the passage opening 32 area and the percentage displacement of the check element 42 exhibits an absolute value variable along the path but always comprised between 0 and 4, for example between 0 and 2.5. More specifically, the incremental ratio falls in a range between 0 and 1.5 in the initial tract that is between 20 and 30% of the operating path. In turn, over the final tract 48 that includes no more than 40% of the operating path, the ratio between incremental percentage change of the passage opening 43 and the percentage displacement of the check element 42 exhibits an absolute value that is variable but comprised between 0 and 4, for example between 0 and 2.5. More specifically this quotient falls in a range between 0 and 1.5 in a final tract that is between 20 and 30% of the operating path. Finally, still with reference to FIG. 12, over an intermediate section 47 of the operating path between the initial tract 45 and the final tract 48 comprising between 20% and 40% of the operating path, the incremental ratio between percentage change of the area of the passage opening 43 and the percentage displacement of the check element 42 exhibits a substantially constant absolute value. Note that the percentage displacement is defined as the ratio between the displacement of the check element 42 and the operating path.

In turn, the percentage change of the passage opening 43 is defined as the ratio between the change in the passage area following a displacement of the check element 42 and a reference area, for example the area of complete opening of the passage opening 43.

Figure 3:
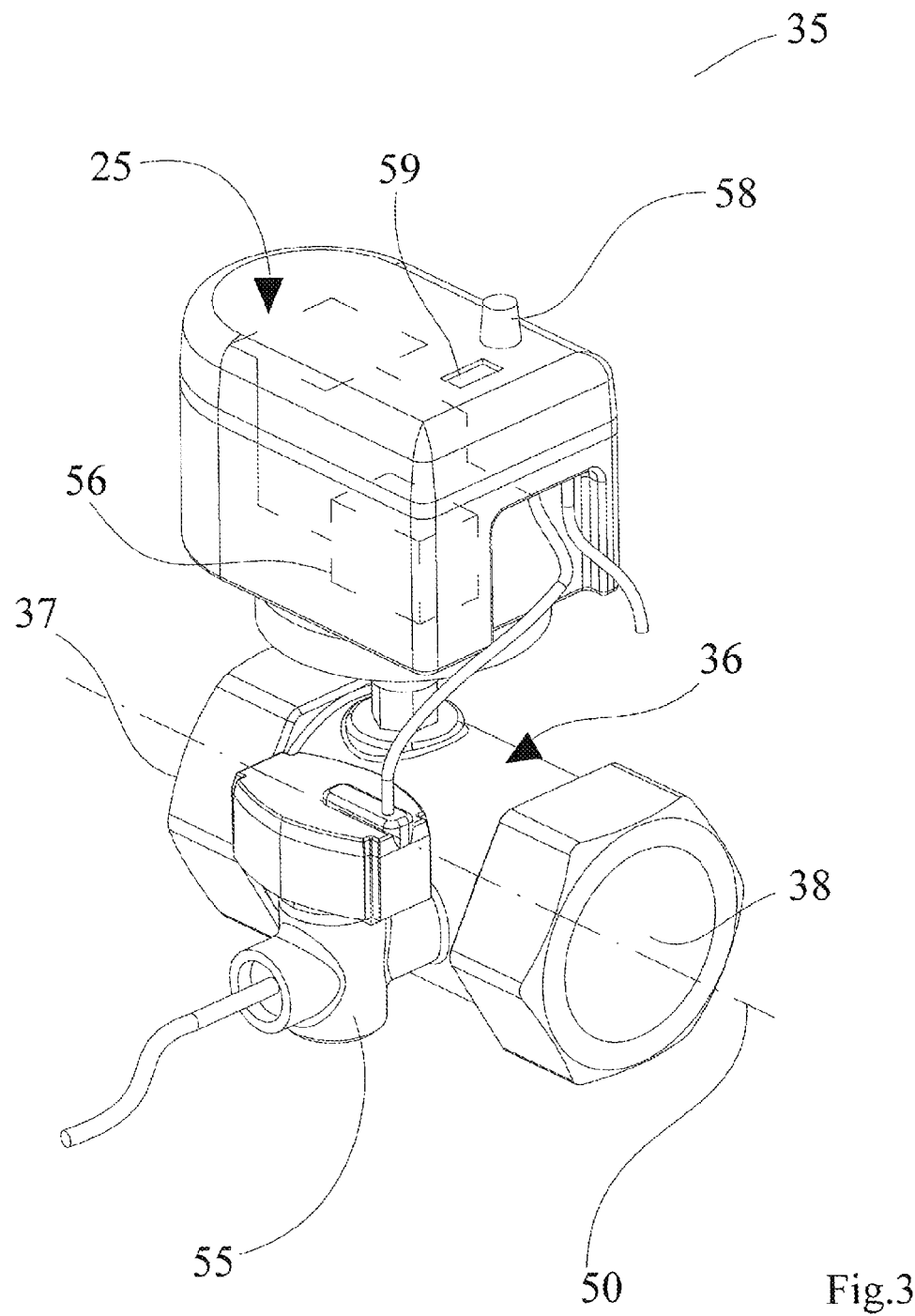
Figure 4:
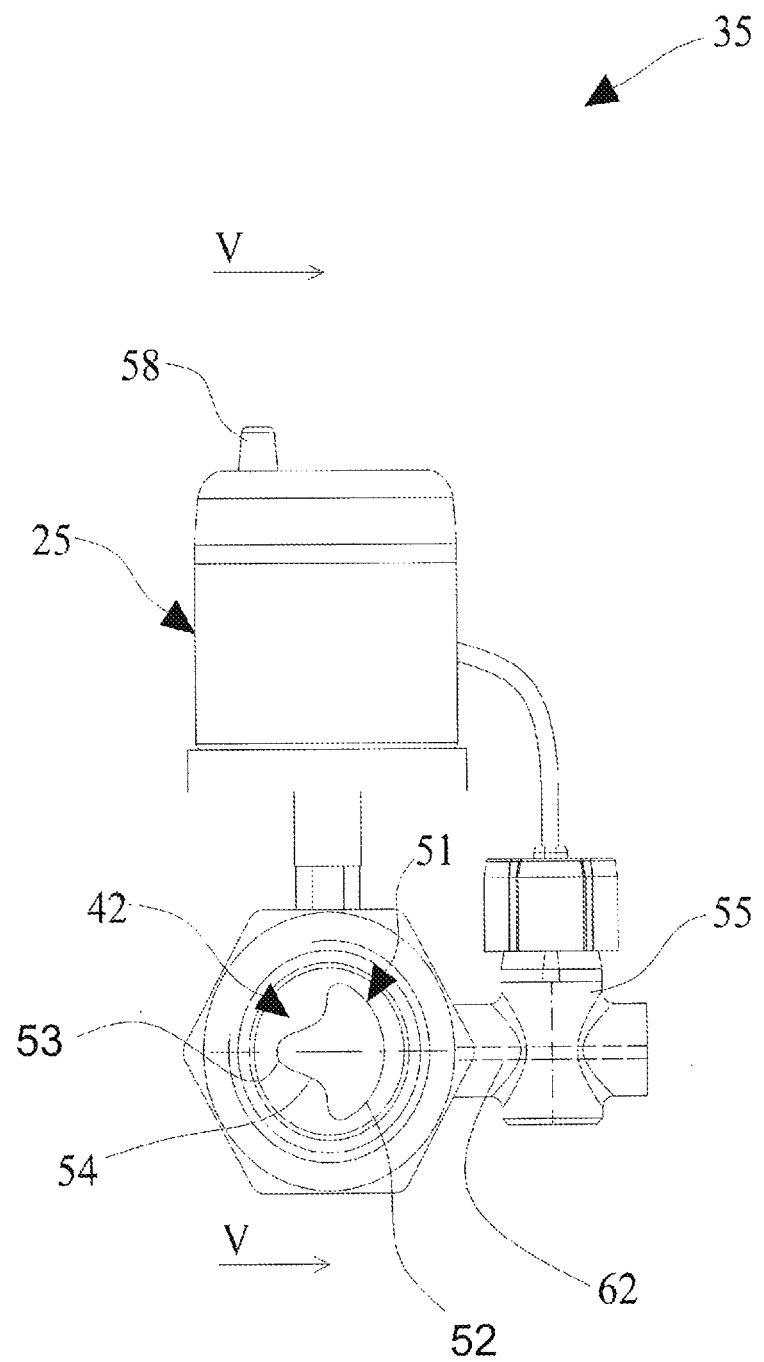
FIG. 4 is a front view of the regulating valve of FIG. 3 in a first use condition.
Figure 5:
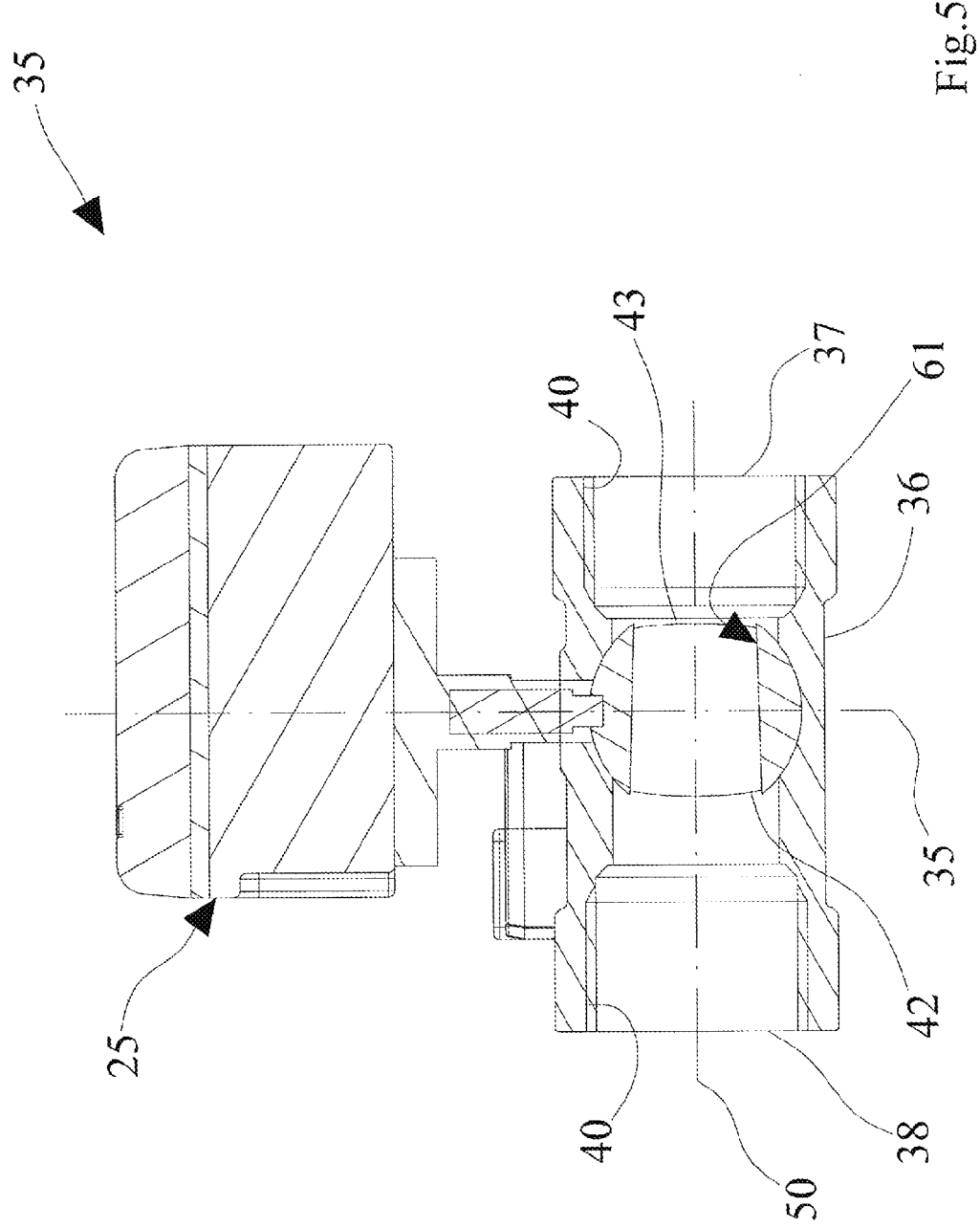
FIG. 5 is a section view of the regulating valve of FIG. 3.
Figure 6:
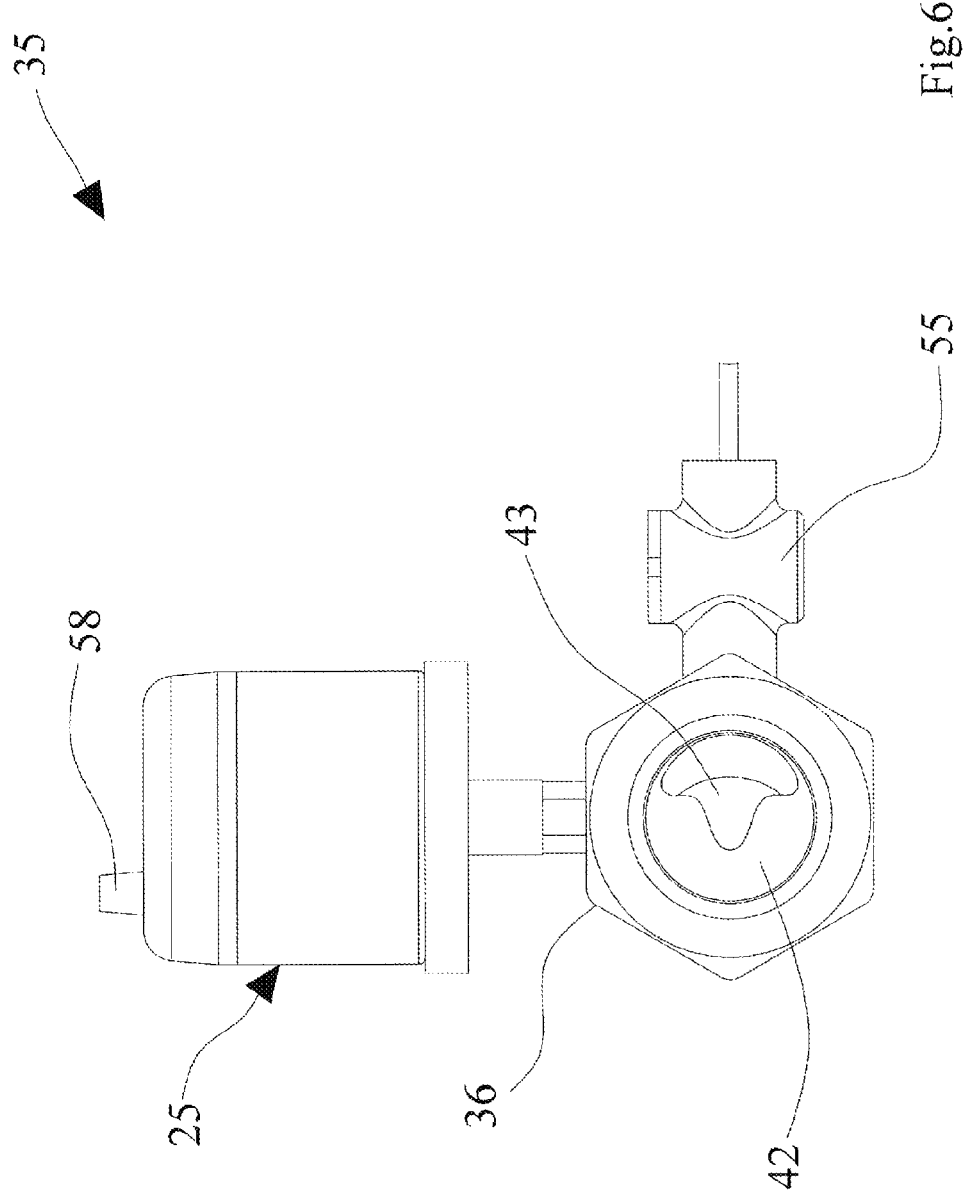
FIG. 6 is a front view of the regulating valve of FIG. 3 in a second use condition.
Figure 7:
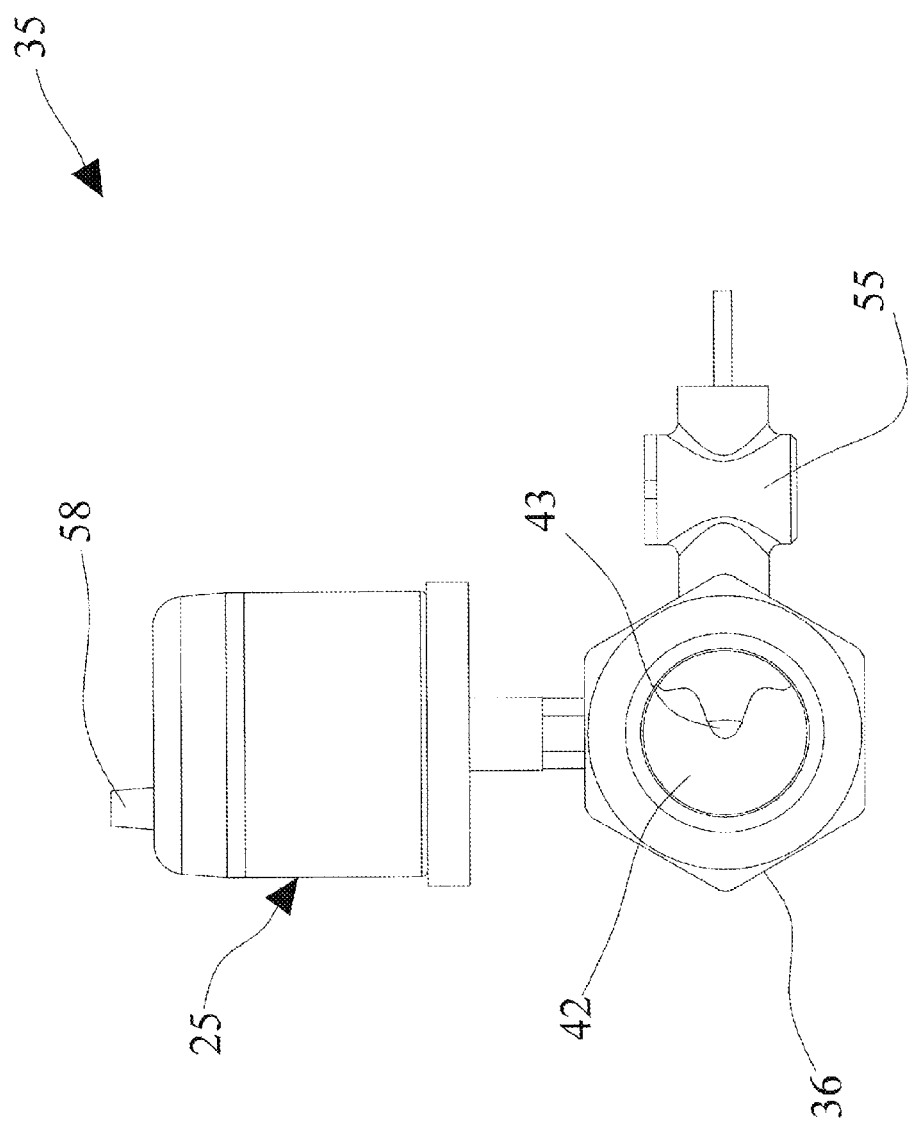
FIG. 7 is a front view of the regulating valve of FIG. 3 in a third use condition.
Figure 8:
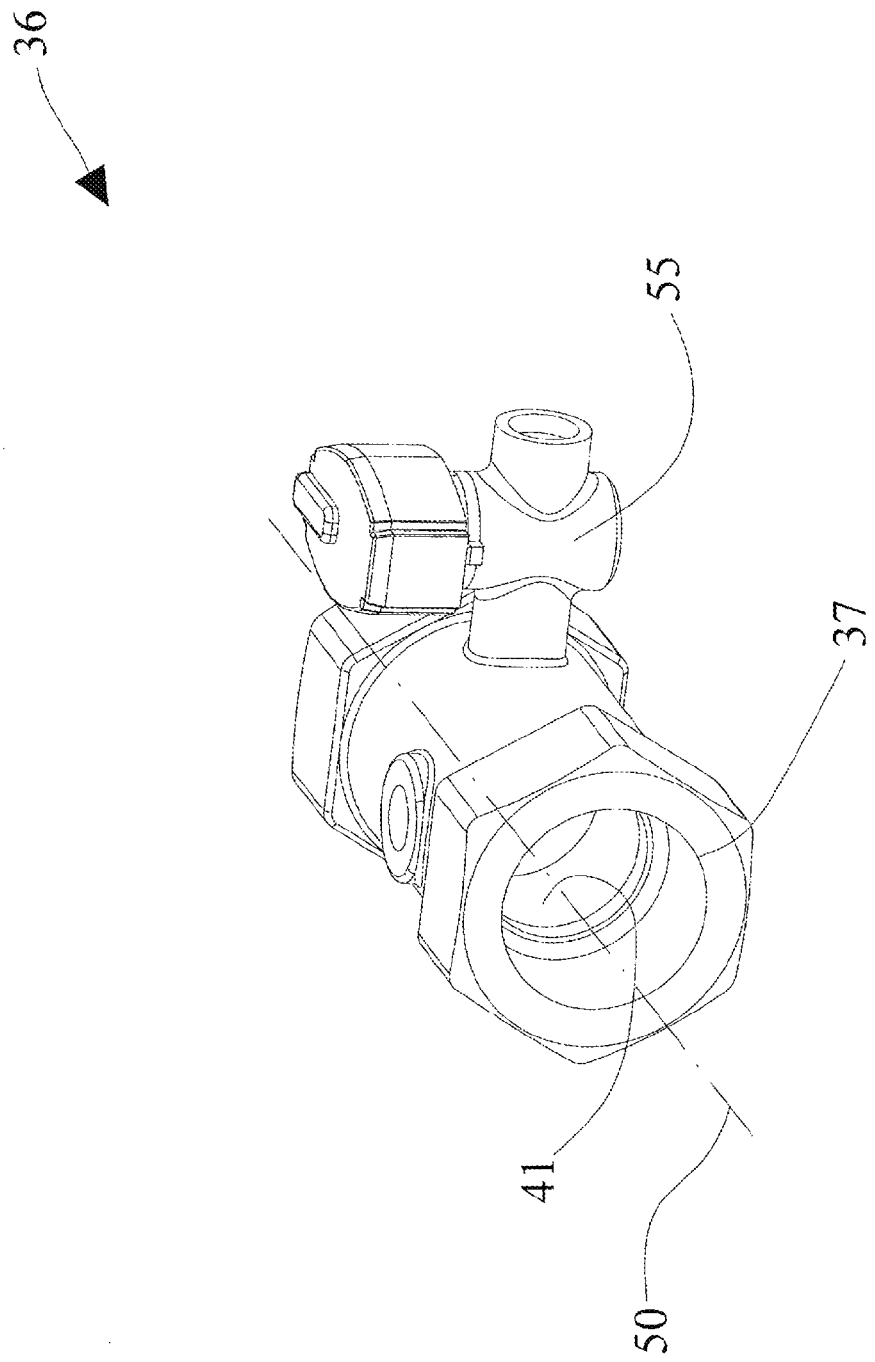
FIG. 8 is a perspective view of the valve body of the valve of FIG. 3.
Figure 9:
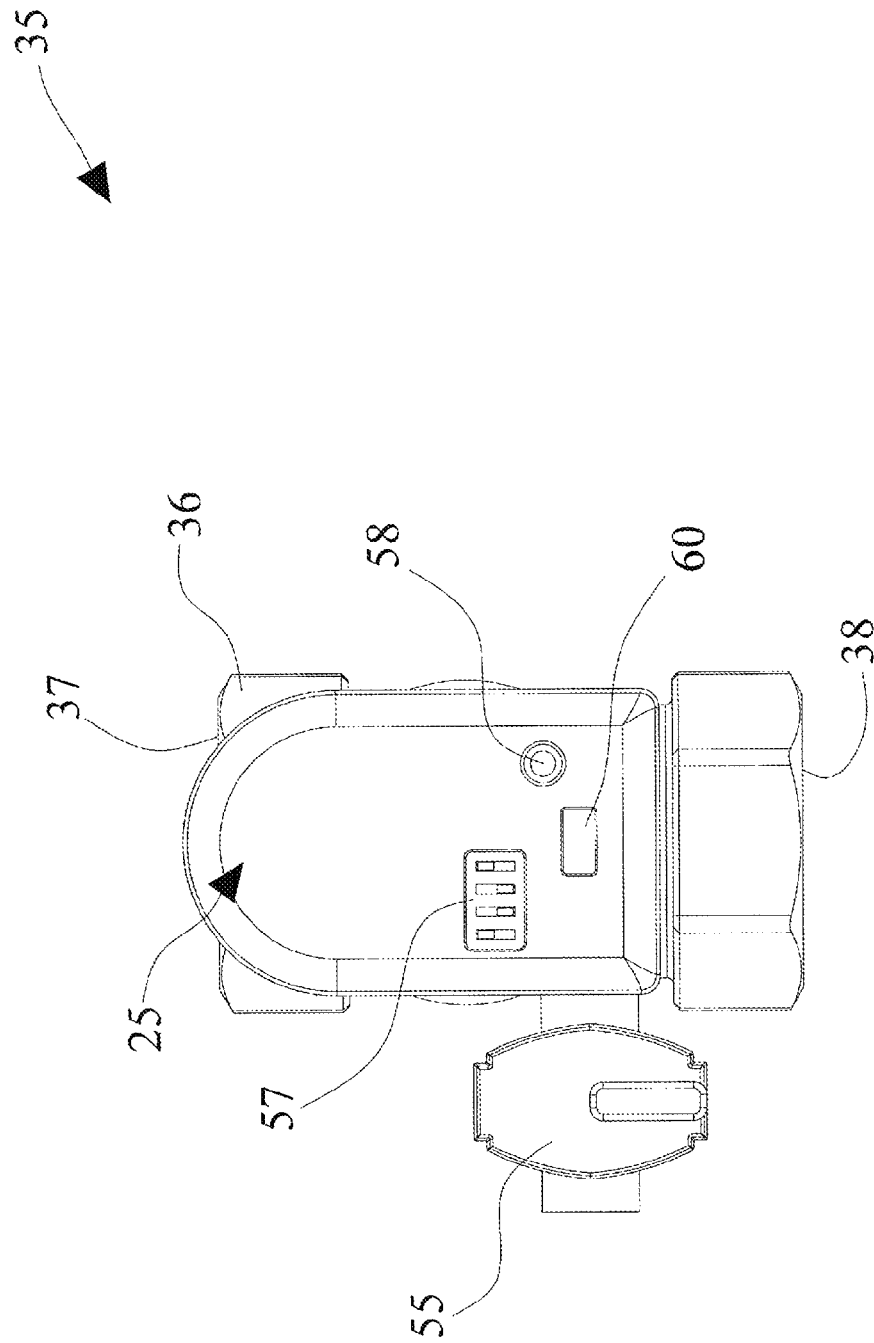
FIG. 9 is a view from above of an alternative embodiment of a control valve used in the system of FIG. 1.
Figure 10:
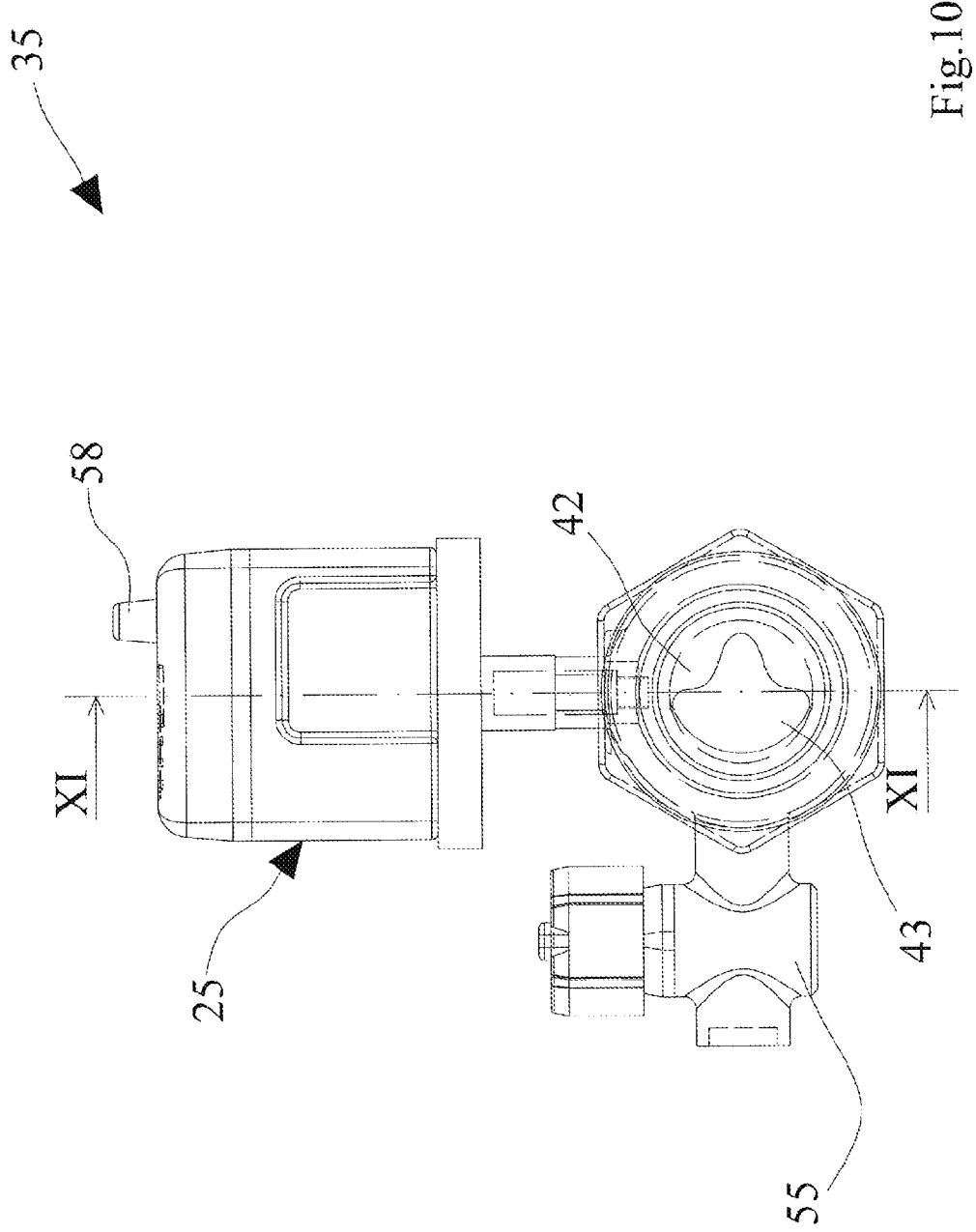
FIG. 10 is a front view of the valve of FIG. 9.
Figure 11:
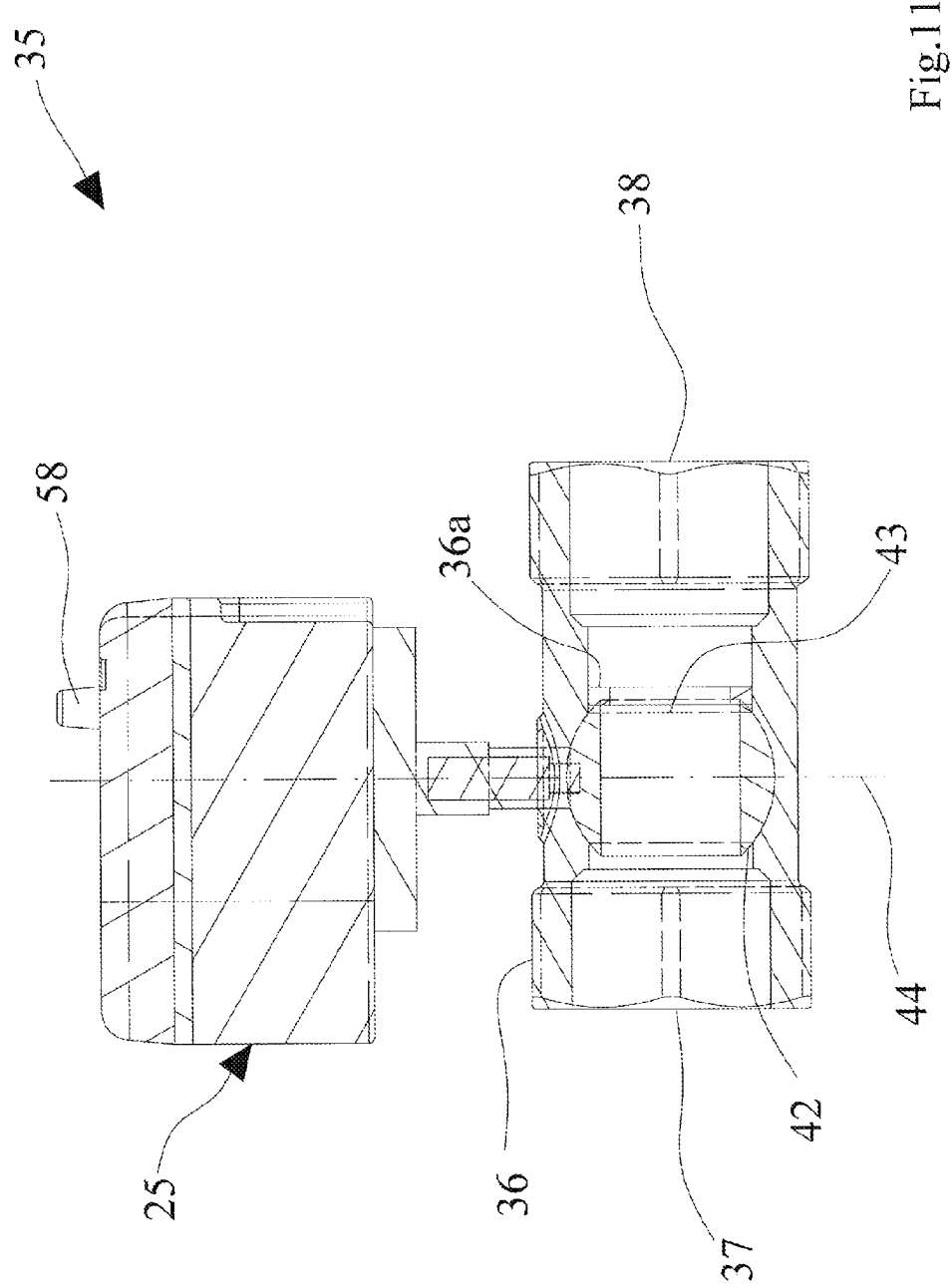
FIG. 11 is a section along line XI-XI of FIG. 10.

As previously described the interception element 42 is operating internally of the channel 39 of valve body 36, and is configured to vary the passage opening 43 through its movement. As can be seen from the figures, the check element 42 is configured to rotate at an angle of motion with respect to an axis of rotation 44 which extends transversally with respect to a prevalent development axis 50 of the channel 39. In particular, the check element 42 can be configured such as to perform a displacement that will reduce or increase the passage area 43. According to a front view, as can be seen in FIG. 3, the passage opening 43 is characterized by a front profiling 51 presenting two substantially symmetrical parts in which each part has a first portion 52, shaped as an arc of a circle, a second portion 53, shaped as an arc of a circle having a smaller radius than that of the first portion 52, a connecting curve 54 which connects the first portion 52 with the second portion 53. According to the longitudinal view, the passage opening 61 has a longitudinal shape, which is characterized by a progressively increasing section from the inlet 37 to the outlet 38 of the valve body 36. In the example shown, although the section progressively grows, the outline of this section in the front view can remain constant and equal to what described above and shown in FIG. 3.

The movement of the regulating organ and therefore the check element 42 is, as mentioned, regulated by the control device 25 which is in particular configured such as to receive at least a first input signal relating to the intensity of the physical parameter of the fluid circulating in the first section of the plant and a second signal relating to the intensity of the same physical parameter of a fluid circulating in the second section of the plant, and then generate an output signal according to the first and second signal. The first and second signals are related to the intensity of fluid pressure respectively in the first and second section of the plant.

The output signal is control differential signal comprising a difference or ratio between the intensity of the first and second signal; for example, the control differential signal includes the difference or the ratio between the intensity of fluid pressure in the first section and the intensity of fluid pressure in the second section. The intensity of the output signal is used to control the position of the check element 34 with a cyclically executed control loop. As a sensor, a differential pressure gauge 55 can be used, which receives in input the first and second signal and generates in output a control differential signal. The differential pressure gauge 55 is disposed on the body 36 of the regulating valve 35 and receives the first signal from the first point 27 and the second signal corresponding to the second point of the system 29. The second point is located substantially at the outlet of the control valve, and is therefore placed after the check element 42, according to the flow direction. The output 38 of the valve and the pressure differential gauge 55 are in fluid connection via a fluid passage 62.

The intensity of the value measured by the differential pressure gauge 55 is either proportional to or a function of the pressure difference between the first and second points 27, 29. Although reference has been made just above to a physical parameter corresponding to the pressure, the physical parameter can also be the delivery; in this case the differential sensor may be a differential between the flow rate in the first and the second segment.

On the section where the valve body is placed a temperature sensor can also be present which measures the temperature of the fluid in outlet from the valve.

The control device 25 is also configured to allow the setting of at least one reference value, compare the reference value with the value of the differential signal control and generate the output signal as a function of the comparison. The comparison of the signals influences the displacement of the moving element 42, which is moved directly by an actuator 56, active on the check element 42, along the operating path. The actuator 56 can be electric or mechanical. The case analyzed shows an actuator 56 of an electrical type that enables placing the check element 42 in a plurality of positions along the operating path. The control device 25 regulates the movement of the check element 42, thereby reducing the difference between the reference value and the value of the control differential signal.

The control device 25 includes a memory which enables storage of a plurality of predetermined reference values and allows the selection thereof by a user.

The controller 25 further comprises setting means 57. The setting means 57 are connected to the control device 25 and enable setting a fixed number of control parameters which define working conditions.

The control device 25 further comprises inlet means 58, which enable a reference value to be set, for example by enabling the setting of a reference differential pressure between the first and second sections.

The control parameters include: a first control parameter on the type of check element 42, a second control parameter relating to an maximum increase in the values of the first and second signal or in the value of the difference between the first and second signals, a third control parameter relating to the type of function which links the outlet signal to the first and the second signals, a fourth control parameter relative to the velocity of convergence between the real value and the reference value.

Going into further detail it can be specified that, in the case where the moving element 42 is of the circular type, the first parameter determines the direction of rotation of the valve 42. Instead the second parameter comprises the bottom-scale values of the pressure differential switch 55 thus defining a range of predetermined values. The third control parameter specifies the type of control function that links the output signal to said first and second signal: for example, this function includes a link of a proportional or integral or derivative type, or a combination of these. The fourth control parameter regulates the speed of convergence of the real value of the reference value set to the control device 25.

The setting means 57 also enable memorisation of a predetermined number of configurations relating to values of the control parameters useful for the management of the control device 25.

In the case shown in the figures the setting means are micro-switches which have only two values for each parameter setting control.

The control valve 35 enables monitoring the real value and the reference value by means of an acoustic signal 59 and/or optical signal means 60. These signalling devices are connected to the control device 25 which is configured to control the acoustic and/or optical means 59, 60 such as to provide: an optical and/or an instantaneous value of the output signal, and/or an optical and/or an acoustic displacement of an instantaneous value of the output signal with respect to a reference value.

The invention claimed is:

1. A conditioning plant comprising:
   at least a general inlet,
   at least a general outlet,
   a circuit which sets the general inlet in fluid communication with the general outlet,
   a plurality of users arranged on the circuit,
   at least one regulating valve operative on the circuit and comprising:
      at least a valve body exhibiting at least an inlet, at least an outlet and at least a channel which sets the inlet in fluid communication with the outlet; and
      at least a fluid check element operating in the channel, the fluid check element defining a passage opening for fluid between the inlet and the outlet which has a variable size as a function of positions assumed by the check element in relation to the valve body along a predetermined operating path, the passage opening being shaped such that following a movement of the check element over the operating path the following condition are complied with:
         the incremental ratio between the percentage variation of the area of the passage opening and the percentage displacement of the check element, over an initial tract which comprises not more than 30% of the operating path, exhibits an absolute value between 0 and 2.5;
         the incremental ratio between percentage variation of the area of the passage opening and the percentage displacement of the check organ, over a final tract which comprises not more than 40% of the operating path, exhibits an absolute value between 0 and 2.5;
         the incremental ratio between percentage variation of the area of the passage opening and the percentage displacement of the check element exhibits an absolute value which is substantially constant over an intermediate tract of the operating path comprised between the initial tract and the final tract, and wherein the intermediate tract comprises between 20% and 40% of the operating path, and
         the percentage variation of the area of the passage opening comprises the ratio between the variation of the passage area following a displacement of the check organ and a reference area, and wherein the percentage displacement comprises the ratio between the displacement of the check element and the operating path,
      wherein the passage opening has a longitudinal shaping relating to a longitudinal section with respect to the prevalent development axis of the channel, exhibiting a progressively growing section from the inlet to the outlet of the valve body, and
      wherein the regulating valve also comprises a control device configured for:
         receiving in input at least a first signal relating to an intensity of a physical parameter of a fluid circulating in a first section of the plant and a second signal relating to the intensity of the physical parameter of a fluid circulating in a second section of the plant, and
         generating an output signal as a function of the first signal and the second signal, the output signal being usable for controlling the position of the check element.

2. The conditioning plant of claim 1, wherein the first signal and the second signal respectively relate to the intensity of the fluid flow rate in the first section and the second section of the plant.

3. The conditioning plant of claim 1, wherein the first signal and the second signal respectively relate to the intensity of the fluid pressure in the first section and the second section of the plant.

4. The conditioning plant of claim 1, wherein generating the output signal comprises determining a control differential signal comprising at least one of:
   a difference between the intensity of the first signal and the second signal,
   a ratio between the intensity of the first signal and the second signal.

5. The conditioning plant of claim 4, wherein the control differential signal comprises one of:
   the difference between the intensity of the fluid flow rate in the first section and the intensity of the fluid flow rate in the second section;
   the ratio between the intensity of the fluid flow rate in the first section and the intensity of the fluid flow rate in the second section;
   the difference between the intensity of the fluid pressure in the first section and the intensity of the fluid pressure in the second section;
   the ratio between the intensity of the fluid pressure in the first section and the intensity of the fluid pressure in the second section.

6. The conditioning plant of claim 4, wherein the control device is configured to:
   enable setting at least a reference value,
   compare the reference value with the value of the control differential signal, and
   generate the output signal as a function of the comparison.

7. The conditioning plant of claim 6, wherein the control device comprises an actuator acting on the check element, the actuator being configured to enable displacement of the check element along the operating path, the control device being connected with the actuator, the control device further being configured for:
   positioning the check element according to a plurality of positions along the operating path, the positions being separated by a step, the control device repeating the steps of comparison and generation at each of the positions; and
   controlling the size of the step by which the actuator moves the check element as a function of the value of the control differential signal and the reference value.

8. The conditioning plant of claim 1, wherein the control device comprises setting means, the setting means being connected to the control device and enabling setting of a predetermined number of control parameters which define operating conditions of the valve, and wherein the control parameters comprise at least a parameter selected from the group having:
   a first control parameter relating to a type of movement of the check element,
   a second control parameter relating to a maximum excursion of the values of the first signal and the second signal or of the value of the difference between the first signal and the second signal, a third control parameter relating to the type of function connecting the output signal and the first signal and the second signal, a fourth control parameter relating to a velocity of convergence between the real value and the reference value, wherein the second control parameter comprises bottom scale values of the pressure differential gauge, wherein in relation to the third parameter the function comprises a link of a proportional or integral or derivative type, or a combination thereof, and wherein the fourth control parameter specifies a convergence time defined as a time transitory in which the value of the control differential signal converges to the reference value, wherein the setting means enable memorization of a predetermined number of configurations relating to values of the control parameters which are useful for managing the control device, wherein the control device comprises input means, the input means enabling setting at least a reference value, and wherein the control device comprises a memory and is configured such as to enable memorization of a plurality of predetermined reference values and to enable a user to select at least one of the values.

9. The conditioning plant of claim 1, wherein:

the check element operating in the channel of the valve body is configured such as to rotate according to a movement angle with respect to a rotation axis which extends transversally with respect to a prevalent development axis of the channel, wherein the check organ exhibits a lateral rotating surface having a cylindrical or spherical conformation;

the incremental ratio between a percentage variation of the area of the passage opening and the percentage displacement of the check element, over the initial tract comprised between 20% and 30% of the operating path, falls within a range of between 0 and 1.5; and the incremental ratio between a percentage variation of the area of the passage opening and the percentage displacement of the check element, over the final tract comprised between 20% and 30% of the operating path, falls within a range of between 0 and 1.5.

10. A conditioning plant comprising:

at least a general inlet, at least a general outlet, a circuit which sets the general inlet in fluid communication with the general outlet, a plurality of users arranged on the circuit, at least one regulating valve operative on the circuit and comprising:

at least a valve body exhibiting at least an inlet, at least an outlet and at least a channel which sets the inlet in fluid communication with the outlet, at least a fluid check element operating in the channel, the fluid check element defining, in cooperation with the valve body, a passage opening for fluid between the inlet and the outlet which has a variable size as a function of positions assumed by the check element in relation to the valve body along a predetermined operating path, the check organ being configured such as to rotate with respect to a rotation axis which extends transversally with respect to a prevalent development axis of the channel, wherein the passage opening is shaped such that following a movement of the check element over one of the initial tract and the final tract of the operating path, the incremental ratio between the percentage variation of the area of the passage opening and the percentage displacement of the check element exhibits an absolute value between 0 and 4, at least a control device configured for:

receiving in input at least a first signal relating to an intensity of a physical parameter of the fluid circulating in a first section of the plant and a second signal relating to the intensity of the physical parameter of a fluid circulating in a second section of the plant, and generating an outlet signal as a function of the first signal and the second signal, the outlet signal being usable for controlling the angular position of the check element, wherein the control device is configured such as to move the check element in a plurality of operating positions which are reciprocally angularly offset, and wherein an angular step is defined between an operating position and an angularly subsequent operating position, the control device repeating the receiving and generating stages of receiving and generating in a predetermined number of the operating positions, wherein at least over a tract of the operating path the angular step is not constant, and wherein the tract in which the step is not constant comprises at least 10% of the operating path, wherein the size of the angular step is calculated by the control unit as a function of the intensity of the physical parameter of the fluid circulating in the first section and of the intensity of the physical parameter of the fluid circulating in the second section of the plant, the tract of the operating path in which the step is not constant comprises the initial tract of the operating path, the initial tract being in turn comprised between an initial position of complete closure of the passage opening and an intermediate position in which the passage opening is open to not more than 40%, the tract of the operating path in which the step is not constant comprises a final tract of the operating path, the final tract being in turn comprised between a final position of complete opening of the passage and an intermediate position in which the passage opening is open to not more than 30%.

11. The conditioning plant of claim 10, wherein the angular step reduces progressively on reduction of a difference between a reference value and a real value given by a difference of intensity of the physical parameter of the fluid circulating in the first section and the intensity of the physical parameter of the fluid circulating in a second section.

12. The conditioning plant of claim 10, wherein the tract of the operating path in which the step constant and is less than 1° comprises an initial tract of the operating path, the initial tract being in turn comprised between an initial position of complete closure of the passage opening and an intermediate position in which the passage opening is open to not more than 40%, wherein the tract of the operating path in which the step is not constant and is less than 1° comprises a final tract of the operating run, the final tract being in turn comprised between a final position of complete opening of the passage and an intermediate position in which the passage opening is open to not more than 50%.

13. The conditioning plant of claim 10, wherein:
the incremental ratio between the percentage variation of the area of the passage opening and the percentage displacement of the check element, over the initial tract which comprises not more than 30% of the operating path, exhibits an absolute value between 0 and 4,
the incremental ratio between the percentage variation of the area of the passage opening and the percentage displacement of the check element, over the final tract which comprises not more than 40% of the operating path, exhibits an absolute value between 0 and 4,
the incremental ratio between percentage variation of the area of the passage opening and the percentage displacement of the check element exhibits an absolute value which is substantially constant over an intermediate tract of the operating run comprised between the initial tract and the final tract,
the intermediate tract comprises between 20% and 40% of the operating path, and
the percentage variation of the area of the passage opening comprises the ratio between the variation of the passage area following a displacement of the check element and a reference area, and wherein the percentage displacement comprises the ratio between the displacement of the check element and the operating path.

14. The conditioning plant of claim 10, wherein the first signal and the second signal respectively relate to the intensity of the fluid flow rate in the first section and the second section of the plant.

15. The conditioning plant of claim 10, wherein the first signal and the second signal respectively relate to the intensity of the fluid pressure in the first section and the second section of the plant.

16. The conditioning plant of claim 10, wherein generating the output signal comprises determining a control differential signal comprising at least one of:
a difference between the intensity of the first signal and the second signal,
a ratio between the intensity of the first signal and the second signal,
wherein the control differential signal comprises one of:
the difference between the intensity of the fluid flow rate in the first section and the intensity of the fluid flow rate in the second section;
the ratio between the intensity of the fluid flow rate in the first section and the intensity of the fluid flow rate in the second section;
the difference between the intensity of the fluid pressure in the first section and the intensity of the fluid pressure in the second section; or
the ratio between the intensity of the fluid pressure in the first section and the intensity of the fluid pressure in the second section.

17. The conditioning plant of claim 10, wherein the control device comprises an actuator acting on the check element, the actuator being configured to enable displacement of the check element along the operating path, the control device being connected with the actuator, the control device further being configured for:
positioning the check element according to a plurality of positions along the operating path, and
controlling the size of the step by which the actuator moves the check element as a function of the value of the control differential signal and the reference value.

18. A conditioning plant comprising:
at least a general inlet,
at least a general outlet,
a circuit which sets the general inlet in fluid communication with the general outlet,
a plurality of users arranged on the circuit,
at least one regulating valve operative on the circuit and comprising:
at least a valve body exhibiting at least an inlet, at least an outlet and at least a channel which sets the inlet in fluid communication with the outlet,
at least a fluid check element operating in the channel, the fluid check element defining a passage opening for fluid between the inlet and the outlet which has a variable size as a function of positions assumed by the check element in relation to the valve body along a predetermined operating path, the passage opening comprising a longitudinal shaping relating to a longitudinal section with respect to the prevalent development axis of the channel, exhibiting a progressively growing section from the inlet to the outlet of the valve body, and
a control device configured for:
receiving in input at least a first signal relating to an intensity of a physical parameter of a fluid circulating in a first section of the plant and a second signal relating to the intensity of the physical parameter of a fluid circulating in the second section of the plant, and
generating an output signal as a function of the first signal and the second signal, the output signal being usable for controlling the position of the check element.

19. The conditioning plant of claim 18, wherein the passage opening is shaped such that following a movement of the check element over at least one of an initial and a final tract of the operating path, the incremental ratio between percentage variation of the area of the passage opening and the percentage displacement of the check element exhibits an absolute value between 0 and 4.00.

20. The conditioning plant of claim 19, wherein the initial tract comprises not more than 30% of the operating path, and wherein the final tract comprises not more than 40% of the operating path.

21. The conditioning plant of claim 19, wherein the incremental ratio between percentage variation of the area of the passage opening and the percentage displacement of the check element exhibits an absolute value which is substantially constant over an intermediate tract of the operating path comprised between the initial tract and the final tract, and wherein the intermediate tract comprises between 20% and 40% of the operating path.

22. The conditioning plant of claim 18, wherein the first signal and the second signal respectively relate to the intensity of the fluid flow rate in the first section and the second section of the plant.

23. The conditioning plant of claim 18, wherein the first signal and the second signal respectively relate to the intensity of the fluid pressure in the first section and the second section of the plant.

24. The conditioning plant of claim 18, wherein generating the output signal comprises determining a control differential signal comprising at least one of:
a difference between the intensity of the first signal and the second signal,
a ratio between the intensity of the first signal and the second signal, wherein the control differential signal comprises one of:
the difference between the intensity of the fluid flow rate in the first section and the intensity of the fluid flow rate in the second section;
the ratio between the intensity of the fluid flow rate in the first section and the intensity of the fluid flow rate in the second section;
the difference between the intensity of the fluid pressure in the first section and the intensity of the fluid pressure in the second section; or
the ratio between the intensity of the fluid pressure in the first section and the intensity of the fluid pressure in the second section.

25. The conditioning plant of claim 18, wherein the control device comprises an actuator acting on the check element, the actuator being configured to enable displacement of the check element along the operating path, the control device being connected with the actuator, the control device further being configured for:
positioning the check element according to a plurality of positions along the operating path, and
controlling the size of the step by which the actuator moves the check element as a function of the value of the control differential signal and the reference value.

26. A conditioning plant comprising:
at least a general inlet,
at least a general outlet,
a circuit which sets the general inlet in fluid communication with the general outlet,
a plurality of users arranged on the circuit,
at least a balancing system of the flow acting on the circuit, the balancing system comprising:
at least a sensor for detecting at least a real value depending on a difference of intensity—between a first section upstream of the users and a second section downstream of the users—of at least a physical parameter of the fluid,
at least a flow regulating organ,
at least a control device connected to the sensor, acting on the flow regulating organ and configured for:
enabling memorization of at least a reference value of a same physical parameter of the fluid,
comparing the reference value with the real value,
commanding the regulating organ via an output signal in order to regulate the fluid internally of the circuit such as to obtain at least one of:
maintaining the real value substantially aligned with the reference value, or
reducing a difference between real value and reference value;
wherein the regulating organ and the control device are part of a regulating valve operating downstream of the users, wherein the regulating valve comprises:
at least a valve body exhibiting at least an inlet,
at least an outlet and at least a channel which sets the inlet in fluid communication with the outlet,
at least a check element of fluid operating in the channel and forming the regulating organ together with the valve body,
wherein the fluid check element defines, in cooperation with the valve body, a passage opening for fluid between the inlet and the outlet of a variable size, according to positions assumed by the check element in relation to the valve body along a predetermined operating path, the check element being configured such as to rotate with respect to a rotation axis which extends transversally with respect to a prevalent axis of development of the channel, and wherein the step of commanding the regulating organ via an output signal, which the control unit is configured to execute, comprises moving the check element among a plurality of distinct operating positions which are angularly offset to one another, and wherein an angular step is defined between an operating position and an angularly subsequent operating position, the control device, following each angular step, being configured to cyclically repeat the stages of comparison and command, further wherein the angular step, at least over a predetermined tract of the operating path, satisfies at least one of the following conditions:
the angular step is less than 1°,
the angular step is not constant over the operating path,
the size of the angular step is a function of the intensity of the physical parameter of the fluid circulating in the first section and the intensity of the physical parameter of the fluid circulating in a second section of the plant, and
the size of the angular step reduces progressively on reduction of a difference between a reference value and a real value given by a difference of intensity of the physical parameter of the fluid circulating in the first section and the intensity of the physical parameter of the fluid circulating in a second section.

27. The conditioning plant of claim 26, comprising a first detecting line which places a first point of the circuit situated upstream of each user in fluid communication with the sensor of the balancing system and in which the plant comprises a second detection line which sets a second point of the circuit situated downstream of each user in fluid communication with the sensor of the balancing system.

28. The conditioning plant of claim 27, wherein the second point is situated substantially on the regulating organ, the regulating organ being situated downstream of each user, directly connected on the circuit and in fluid communication with the sensor, and wherein the sensor is one in the group of:
a differential sensor, which enables detecting the intensity difference between upstream and downstream of the users of the physical parameter of the fluid, and wherein the sensor detects a difference between a first real value relative to the intensity of the physical parameter at the first point of the circuit, and a second real value relative to the intensity of the physical parameter relative to the second point of the circuit, or
a first sensor, which is in fluid connection with the first detecting line and enables detecting the intensity of the physical parameter at the first point of the circuit, and a second sensor which is in fluid connection with the second detecting line and enables detecting the intensity of the physical parameter at the second point of the circuit.

29. The conditioning plant of claim 26, wherein each user comprises a respective delivery channel emerging from the circuit, a respective return channel in fluid connection with the delivery channel and arranged such as to return fluid into the circuit, at least a user device hydraulically interposed between the delivery channel and the return channel,
wherein each user exhibits at least a respective closing organ arranged either on the delivery channel or on the return channel,
wherein the plant comprises at least a delivery manifold arranged upstream of the users, at least a return manifold arranged downstream of the users, the delivery manifold and the return manifold being respectively connected to the general inlet for the distribution of the fluid to the users and to the general outlet for collecting the fluid in outlet from the users, and wherein the regulating organ is engaged to a line interposed between an outlet of the return manifold and the general outlet.

30. The conditioning plant of claim 26, wherein the tract of the operating path in which said angular step satisfies one or more of said conditions is one of:

an initial tract of the operating path, the initial tract being in turn comprised between an initial position of complete closure of the passage opening and an intermediate position in which the passage opening is open to not more than 40% and a final tract of the operating path, the final tract being in turn comprised between a final position of complete opening of the passage and an intermediate position in which the passage opening is open to not more than 50%, further wherein the passage opening is shaped such that following a movement of the check element over one of an initial tract and a final tract of the operating path, the incremental ratio between the percentage variation of the area of the passage opening and the percentage displacement of the check element exhibits an absolute value comprised between 0 and 4.

31. The conditioning plant of claim 26, wherein the control device is configured for:

receiving in input at least a first signal relating to an intensity of the physical parameter of the fluid circulating in the first section of the plant and a second signal relating to the intensity of the physical parameter of a fluid circulating in the second section of the plant, generating the output signal as a function of the first signal and the second signal;

wherein the first signal relates to an intensity of the fluid pressure or of the fluid flow rate in the first section and the second signal relates to an intensity of the fluid pressure or of the fluid flow rate in the second section of the plant, and wherein generating the output signal comprises determining a control differential signal comprising one of a difference and a ratio between the intensity of the first signal and the second signal.

* * * * *